US011324377B2

(12) United States Patent
Qian

(10) Patent No.: US 11,324,377 B2
(45) Date of Patent: May 10, 2022

(54) AUTONOMOUS PLANAR SURFACE CLEANING ROBOT

(71) Applicant: Ecovacs Robotics, Inc., Canton, OH (US)

(72) Inventor: Dongqi Qian, San Francisco, CA (US)

(73) Assignee: ECOVACS ROBOTICS, INC., Canton, OH (US)

( * ) Notice: Subject to any disclaimer, the term of this patent is extended or adjusted under 35 U.S.C. 154(b) by 479 days.

(21) Appl. No.: 16/294,278

(22) Filed: Mar. 6, 2019

(65) Prior Publication Data

US 2019/0200832 A1 Jul. 4, 2019

Related U.S. Application Data

(60) Continuation of application No. 15/488,127, filed on Apr. 14, 2017, now Pat. No. 10,258,215, which is a (Continued)

(51) Int. Cl.
*A47L 11/40* (2006.01)
*A47L 1/02* (2006.01)
(Continued)

(52) U.S. Cl.
CPC ............ *A47L 11/4066* (2013.01); *A47L 1/02* (2013.01); *A47L 11/38* (2013.01);
(Continued)

(58) Field of Classification Search
CPC .... A47L 11/4066; A47L 11/102; A47L 11/02; A47L 11/38; A47L 11/4008;
(Continued)

(56) References Cited

U.S. PATENT DOCUMENTS 4,556,940 A 12/1985 Katoo
5,485,645 A 1/1996 Ohtsuki
(Continued)

FOREIGN PATENT DOCUMENTS

CN 1075246 C 9/1997
CN 2452438 Y 10/2001
(Continued)

OTHER PUBLICATIONS

CN Office Action in Application No. 201580024976.5 dated Jul. 3, 2018.
(Continued)

*Primary Examiner* — Monica S Carter
*Assistant Examiner* — Abbie E Quann
(74) *Attorney, Agent, or Firm* — Maschoff Brennan

(57) ABSTRACT

A driving mechanism for an autonomous planar surface cleaning robot is disclosed. The driving mechanism includes a first transmission component and a second transmission component spaced apart in parallel relationship relative to the first transmission component. Each of the first and second transmission components defines first and second ends and first and second sides, wherein the first sides face each other and the second sides face away from each other in a direction transverse from the direction of motion and the first and second ends are oppositely spaced along the direction of motion. Each of the first and second transmission components are independently controllable by a control unit of the autonomous planar surface cleaning robot.

13 Claims, 21 Drawing Sheets

Related U.S. Application Data division of application No. 14/968,192, filed on Dec. 14, 2015, now Pat. No. 9,655,484, which is a division of application No. 14/209,543, filed on Mar. 13, 2014, now Pat. No. 9,215,962.

(51) Int. Cl.

| | | |
|---|---|---|
| *A47L 11/38* | (2006.01) | |
| *B62D 11/04* | (2006.01) | |
| *B62D 55/06* | (2006.01) | |
| *G05D 1/02* | (2020.01) | |
| *F16H 1/16* | (2006.01) | |
| *F16H 1/28* | (2006.01) | |
| *F16H 37/04* | (2006.01) | |

(52) U.S. Cl.
CPC ....... *A47L 11/4008* (2013.01); *A47L 11/4011* (2013.01); *A47L 11/4036* (2013.01); *A47L 11/4061* (2013.01); *A47L 11/4075* (2013.01); *B62D 11/04* (2013.01); *B62D 55/06* (2013.01); *G05D 1/021* (2013.01); *A47L 2201/04* (2013.01); *A47L 2201/06* (2013.01); *F16H 1/16* (2013.01); *F16H 1/28* (2013.01); *F16H 37/041* (2013.01)

(58) Field of Classification Search
CPC .............. A47L 11/4011; A47L 11/4036; A47L 11/4061; A47L 11/4075; B62D 11/04; B62D 55/06; G05D 1/021; F16H 1/16; F16H 1/28

See application file for complete search history.

(56) References Cited

U.S. PATENT DOCUMENTS

| | | | |
|---|---|---|---|
| 5,655,247 A | 8/1997 | Allen et al. | |
| 6,038,501 A | 3/2000 | Kawakami | |
| 6,883,201 B2 | 4/2005 | Jones et al. | |
| 7,093,318 B2 | 8/2006 | Konrad | |
| 7,448,113 B2 | 11/2008 | Jones et al. | |
| 8,099,818 B2 | 1/2012 | Miyake et al. | |
| 8,239,992 B2 | 8/2012 | Schnittman | |
| 9,084,519 B2 | 7/2015 | Chao | |
| 9,215,962 B2 * | 12/2015 | Qian | .................. A47L 11/4061 |
| 9,427,127 B2 | 8/2016 | Dooley et al. | |
| 9,896,139 B2 | 2/2018 | Chao | |
| 2004/0262060 A1 | 12/2004 | Kim | |
| 2005/0022331 A1 | 2/2005 | Kim | |
| 2005/0172445 A1 | 8/2005 | Diehl et al. | |
| 2006/0143845 A1 | 7/2006 | Miyake et al. | |
| 2006/0293808 A1 | 12/2006 | Qian | |
| 2007/0032904 A1 | 2/2007 | Kawagoe et al. | |
| 2012/0151706 A1 | 6/2012 | Seo | |
| 2013/0037050 A1 | 2/2013 | Chao et al. | |
| 2014/0131123 A1 | 5/2014 | Jang et al. | |
| 2014/0223678 A1 | 8/2014 | Chiu et al. | |
| 2015/0128996 A1 | 5/2015 | Dooley et al. | |
| 2017/0079487 A1 | 3/2017 | Feng et al. | |

FOREIGN PATENT DOCUMENTS

| | | |
|---|---|---|
| CN | 1688235 A | 10/2005 |
| CN | 1709654 A | 12/2005 |
| CN | 201176192 Y | 1/2009 |
| CN | 202154633 U | 3/2012 |
| CN | 202243068 U | 5/2012 |
| CN | 102653289 A | 9/2012 |
| CN | 202537389 U | 11/2012 |
| CN | 202669947 U | 1/2013 |
| CN | 102949143 A | 3/2013 |
| KR | 10-2000-0010460 A | 2/2000 |
| KR | 10-2008-0068165 A | 7/2008 |
| KR | 10-2013-0064862 A | 6/2013 |
| KR | 10-1314626 A | 10/2013 |

OTHER PUBLICATIONS

CN Office Action in Application No. 201580024976.5 dated Mar. 11, 2019.
International Search Report in Application No. PCT/US2015/020335 dated Jun. 23, 2015.
EP Summons to attend oral proceedings in Application No. 15 761 419.9 dated Oct. 24, 2019.
EP Search Report in Application No. 15 76 1419.9 dated Feb. 22, 2017.
EP Office Action in Application No. 15 761 219.9 dated Jul. 7, 2020.

* cited by examiner

AUTONOMOUS PLANAR SURFACE CLEANING ROBOT

CROSS-REFERENCE TO RELATED APPLICATIONS

This application is a continuation application claiming priority under 35 U.S.C. § 120 to U.S. patent application Ser. No. 15/488,127, filed Apr. 14, 2017, entitled AUTONOMOUS PLANAR SURFACE CLEANING ROBOT, which is a divisional application claiming priority under 35 U.S.C. § 121 to U.S. patent application Ser. No. 14/968,192, filed Dec. 14, 2015, entitled AUTONOMOUS PLANAR SURFACE CLEANING ROBOT, which is a divisional application claiming priority under 35 U.S.C. § 121 to U.S. patent application Ser. No. 14/209,543, filed Mar. 13, 2014, entitled AUTONOMOUS PLANAR SURFACE CLEANING ROBOT, the entire disclosures of which are hereby incorporated by reference herein.

BACKGROUND

The present disclosure relates to cleaning devices, and more particularly, to autonomous planar surface cleaning robots. In particular, the present disclosure relates to autonomous cleaning robots that include a transport driving mechanism, at least one vacuum source, and a cleaning zone and are capable of autonomously cleaning a vertical planar surface such as a window pane. More particularly, the present disclosure relates to autonomous cleaning robots that suction to vertical planar surfaces such as a window pane using negative air pressure, e.g., vacuum. More particularly, the present disclosure relates to transport driving mechanisms to enable cleaning robots to move autonomously over a vertical planar surface while cleaning the surface.

Traditionally, household windows are cleaned by opening or dismounting the windows by manpower while the windows of a high building are cleaned by cleaning workers outside the building. It is very trouble and dangerous. Autonomous cleaning robots can be employed to clean vertical planar surfaces such as windows.

Despite recent advances in autonomous cleaning robots there is a need for an improved low cost, light weight, and easy to use autonomous planar surface cleaning robot for household use. There is also a need for an autonomous cleaning robot having a small size that is convenient to use. Furthermore, there is a need for an autonomous cleaning robot that includes a feedback control mechanism to sense dangerous conditions while the robot is in motion and respond in a sufficient amount of time to avoid such dangerous conditions.

SUMMARY

One aspect of the present disclosure provides a driving mechanism for an autonomous planar surface cleaning robot. The driving mechanism comprises a first transmission component and a second transmission component spaced apart in parallel relationship relative to the first transmission component. Each of the first and second transmission components defines first and second ends and first and second sides, wherein the first sides face each other and the second sides face away from each other in a direction transverse from the direction of motion and the first and second ends are oppositely spaced along the direction of motion. Each of the first and second transmission components are independently controllable by a control unit of the autonomous planar surface cleaning robot.

Another aspect of the present disclosure provides a driving mechanism for an autonomous planar surface cleaning robot. The driving mechanism comprises a first transmission component comprising a first motor electrically coupled to a control unit, and a second transmission component comprising a second motor electrically coupled to the control unit, wherein the second transmission component is spaced apart in parallel relationship relative to the first transmission component. Each of the first and second transmission components defines first and second ends and first and second sides, wherein the first sides face each other and the second sides face away from each other in a direction transverse from the direction of motion and the first and second ends are oppositely spaced along the direction of motion. Each of the first and second transmission components are independently controllable by the control unit.

Another aspect of the present disclosure provides a driving mechanism for an autonomous planar surface cleaning robot. The driving mechanism comprises a first transmission component comprising a first transmission system, and a second transmission component comprising a second transmission system, wherein the second transmission component is spaced apart in parallel relationship relative to the first transmission component. Each of the first and second transmission components defines first and second ends and first and second sides, wherein the first sides face each other and the second sides face away from each other in a direction transverse from the direction of motion and the first and second ends are oppositely spaced along the direction of motion. Each of the first and second transmission components are independently controllable by a control unit.

In addition to the foregoing, various other aspects of devices and/or processes are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting of the claimed subject matter. Other aspects, features, and advantages of the devices and/or processes and/or other subject matter described herein will become apparent in the teachings set forth herein.

In one or more various aspects, related systems include but are not limited to circuitry and/or programming for effecting herein-referenced method aspects; the circuitry and/or programming can be virtually any combination of hardware, software, and/or firmware configured to effect the herein-referenced method aspects depending upon the design choices of the system designer. In addition to the foregoing, various other method and/or system aspects are set forth and described in the teachings such as text (e.g., claims and/or detailed description) and/or drawings of the present disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

FIGURES

The novel features of the embodiments described herein are set forth with particularity in the appended claims. The embodiments, however, both as to organization and methods of operation may be better understood by reference to the following description, taken in conjunction with the accompanying drawings as follows.

DESCRIPTION

Figure 1:
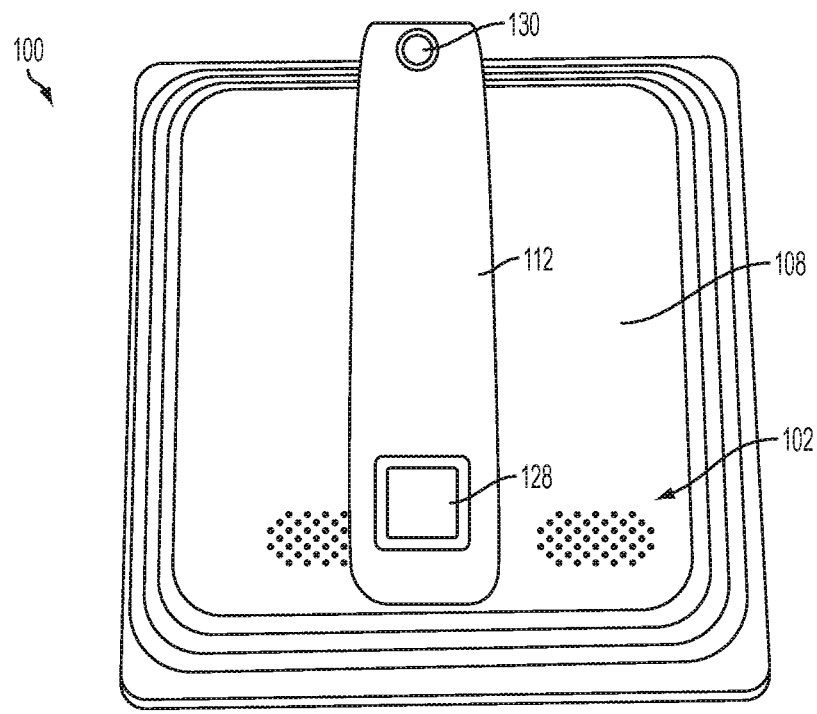
FIG. 1 is a top perspective view of an autonomous planar surface cleaning robot in accordance with one embodiment.

In the following detailed description, reference is made to the accompanying drawings, which form a part hereof. In the drawings, similar symbols and reference characters typically identify similar components throughout the several views, unless context dictates otherwise. The illustrative embodiments described in the detailed description, drawings, and claims are not meant to be limiting. Other embodiments may be utilized, and other changes may be made, without departing from the scope of the subject matter presented here.

Before explaining various embodiments of autonomous planar surface cleaning robots in detail, it should be noted that the various embodiments disclosed herein are not limited in their application or use to the details of construction and arrangement of parts illustrated in the accompanying drawings and description. Rather, the disclosed embodiments may be positioned or incorporated in other embodiments, variations and modifications thereof, and may be practiced or carried out in various ways. Accordingly, embodiments of autonomous planar surface cleaning robots disclosed herein are illustrative in nature and are not meant to limit the scope or application thereof. Furthermore, unless otherwise indicated, the terms and expressions employed herein have been chosen for the purpose of describing the embodiments for the convenience of the reader and are not to limit the scope thereof. In addition, it should be understood that any one or more of the disclosed embodiments, expressions of embodiments, and/or examples thereof, can be combined with any one or more of the other disclosed embodiments, expressions of embodiments, and/or examples thereof, without limitation.

Also, in the following description, it is to be understood that terms such as front, back, inside, outside, top, bottom, left, right, and the like are words of convenience and are not to be construed as limiting terms. Terminology used herein is not meant to be limiting insofar as devices described herein, or portions thereof, may be attached or utilized in other orientations. The various embodiments will be described in more detail with reference to the drawings.

Figure 2:
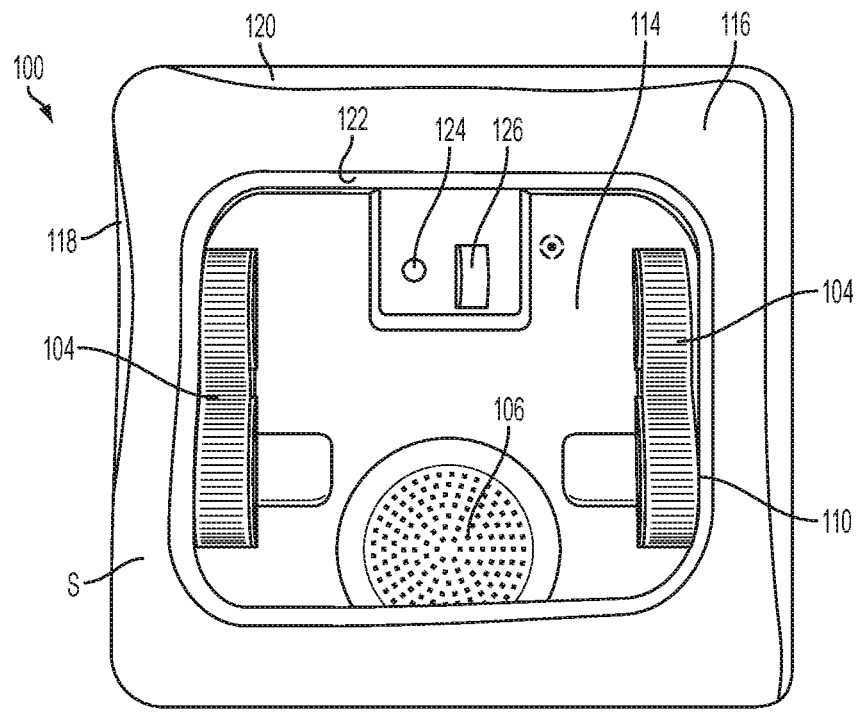
FIG. 2 is a bottom view of the autonomous cleaning robot shown in FIG. 1 in accordance with one embodiment.

Accordingly, turning now to FIG. 1, there is illustrated a top perspective view of an autonomous planar surface cleaning robot 100 in accordance with one embodiment and FIG. 2, which is a bottom view of the autonomous cleaning robot 100 shown in FIG. 1. With reference now to FIGS. 1 and 2, in one embodiment, the autonomous cleaning robot 100 is a robot configured for cleaning a planar surface such as, for example, a glass pane or plate glass commonly used for windows, glass doors, transparent walls, and windshields. Nevertheless, although the various embodiments of the autonomous cleaning robot 100 are primarily disclosed in the context of a window cleaning application and particularly to clean vertically erect plate glass structures, such as a window, the autonomous cleaning robot 100 should not be construed as being limited to this application. For example, the autonomous cleaning robot 100 may be adapted and configured for cleaning any suitable planar surface whether oriented vertically, horizontally, or any suitable position therebetween. Suitable planar surfaces include, without limitation, any substantially flat plates, sheets made of various materials such as glass, mirrors, plastic, and/or metal, and/or any combination thereof, without limitation. The autonomous cleaning robot 100 is configured to attach to a vertical substantially flat planar structure by suction developed by negative air pressure between the robot 100 and the planar structure. In any such cleaning applications, the autonomous cleaning robot 100 is configured to clean the planar surface while moving autonomously along the surface.

Figure 6:
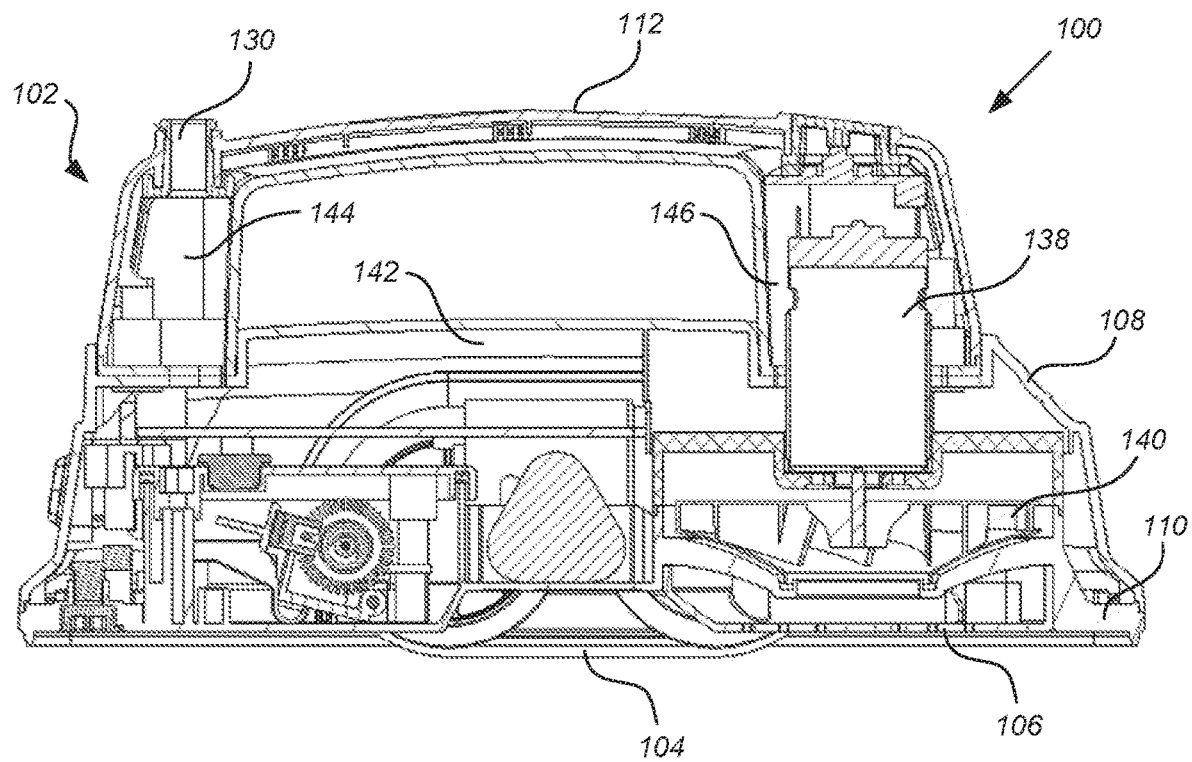
FIG. 6 is a cross-sectional view of the autonomous cleaning robot shown in FIGS. 1-4 in accordance with one embodiment.
Figure 7:
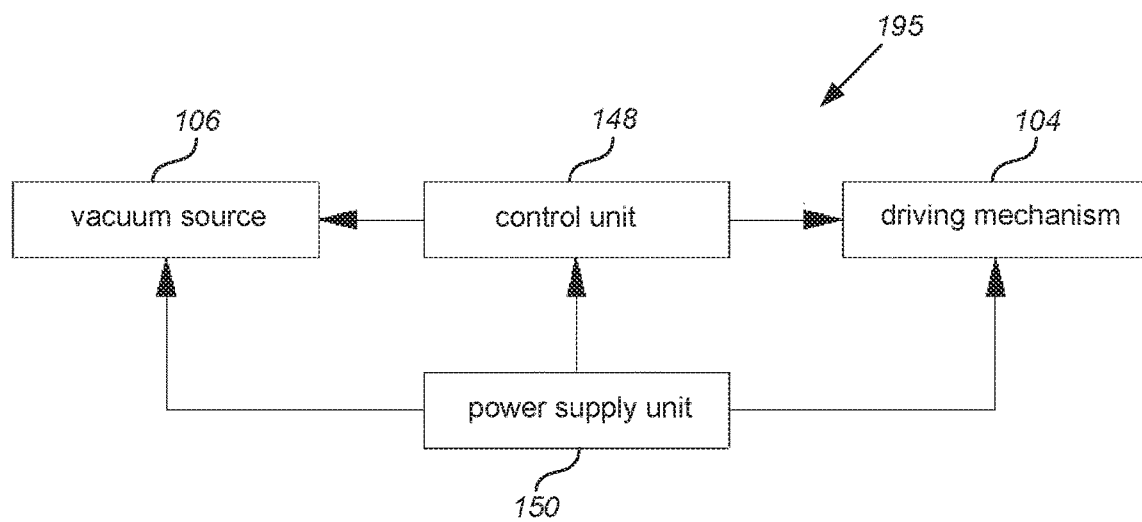
FIG. 7 is a schematic block diagram showing the inter-relationship of various subsystems of an autonomous planar surface cleaning robot in accordance with one embodiment.
Figure 28:
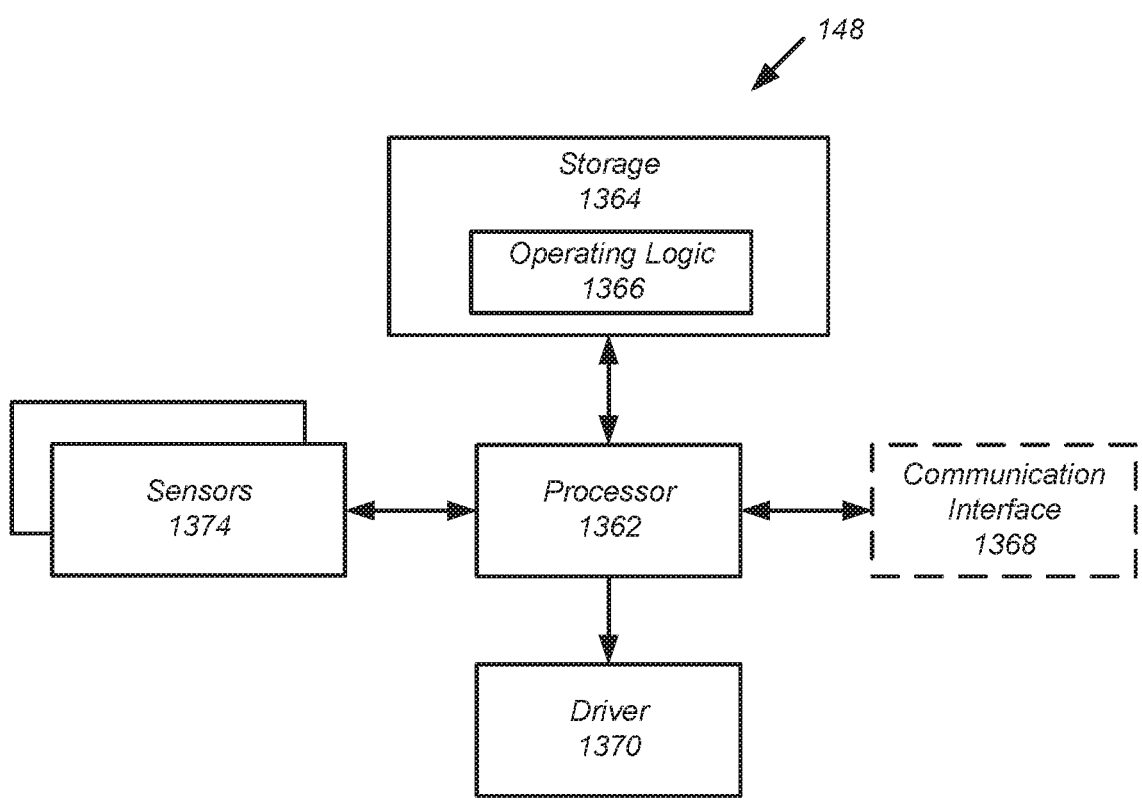
FIG. 28 illustrates an architectural or component view of a control unit for an autonomous planar surface cleaning robot in accordance with one embodiment.

Still with reference to FIGS. 1 and 2, in one embodiment the autonomous planar surface cleaning robot 100 comprises a main body 102, a driving mechanism 104 (or unit), at least one vacuum source 106, and a control unit 148 (shown in FIGS. 7 and 28). The main body 102 comprises a cover 108 portion and a base 110 portion. A handle 112 is positioned on an upper external portion of the cover 108. A cavity 142 (shown in FIG. 6) is defined between the cover 108 and the base 110. The vacuum source 106 and the control unit 148 are positioned and supported within the cavity 142. The driving mechanism 104 (or unit), the at least one vacuum source 106, and the control unit 148 are supported by the main body 102.

In one embodiment, the driving mechanism 104 of the autonomous planar surface cleaning robot 100 comprises two driving mechanisms arranged laterally to the left and right sides of the main body 102. As shown in combination with FIG. 20, each driving mechanism 104 comprises a motor 105a, a gear reducer 152a, and a transmission system 154a, as described in more detail hereinbelow in connection with FIGS. 20-22. The transmission system 154a comprises a synchronization belt 156, a synchronization driving wheel 158, and a synchronization wheel 160. The motor 105a rotatably drives the synchronization driving wheel 158 to rotate the synchronization wheel 160 via the belt 156. The motion can be either forwards or backwards and each driving mechanism 104 can be operated independently to steer the autonomous cleaning robot 100 in a desired direction. It will be appreciated that as used herein the term "steer" means to guide or control the movement of or turn a vehicle such as a robot.

With reference now to FIGS. 1, 2, and 6, the vacuum source 106 comprises a vacuum motor 138 and an impeller 140 located within the inner space of the main body 102 and the handle 112. In detail, the impeller is located within the cavity 142 and the motor 138 is located within the space of the cavity 142 and an inner cavity 146 of the handle 112. The autonomous planar surface cleaning robot 100 further comprises a removable cleaning component 116, which may be referred to herein as a duster, for example. The removable cleaning component 116 is located about the outer perimeter of the base 110 and completely surrounds the base 110. The removable cleaning component 116 defines an outer perimeter 120 and an inner perimeter 122, where the outer perimeter 120 is substantially aligned with the outer perimeter 118 of the base 110. The center portion of the base 110 is recessed from the outer portion 118 of the base 110 and defines a cavity 114 in the base 110 in a location within the inner perimeter 122 of the cleaning component 116. Accordingly, when the autonomous cleaning robot 100 is located on a substantially flat planar surface and the vacuum source 106 is operational, a vacuum is developed between the cavity 114 and the planar surface. The removable cleaning component 116 also acts as a seal to maintain the vacuum pressure to a suitable degree. The vacuum pressure can be selected such that the autonomous cleaning robot 100 can be attached to the planar surface while still being able to move over the planar surface to perform its cleaning function, regardless of whether the planar surface is oriented vertically, horizontally or any position therebetween.

With reference to just FIGS. 1 and 2, the autonomous planar surface cleaning robot 100 further comprises a light emitting diode (LED) indicator 124 and a castor 126 at the bottom of the base 110. The castor 126 is a follower wheel and operates such that when the autonomous cleaning robot 100 meets a frame or other obstruction along the planar surface, the castor 126 will be in an abnormal state causing the control unit 148 (FIGS. 7 and 28) to control the driving mechanism 104 to cause the autonomous cleaning robot 100 to turn in a different direction according the status of the castor 126. Accordingly, the castor 126 further ensures the safety of the autonomous robot 100. The LED indicator 124 will flash when the autonomous cleaning robot 100 is in a dangerous position.

Turning briefly now just to FIG. 1, which shows a second LED indicator 128 arranged on top of the handle 112. The function of the second LED indicator 128 is the same as the function of the first LED indicator 124 positioned at the bottom of the base 110. Both LED indicators 124, 128 inform the user of the status of the autonomous planar surface cleaning robot 100 regardless of whether the autonomous cleaning robot 100 is working inside or outside a transparent or translucent planar surface relative to the user.

As shown in FIG. 1, a power cord (not shown) is positioned in the handle 112 through an opening 130 provided therethrough. The power cord is configured plug into a conventional electrical power outlet to supply electrical power for the driving mechanism 104, the vacuum source 106, and the control unit 148 (FIGS. 7 and 28), among other elements that require electrical power.

Various embodiments of the planar surface cleaning robots described herein employ a vacuum to adhere the robot to a vertical planar surface. This enables the cleaning robot to attach itself and move along vertical a vertical wall, such as, for example, a window pane. In order for the cleaning robot to remain attached to a vertical wall, the following relationship must be satisfied:

$$PS\mu \geq G \qquad (1)$$

Where P is the vacuum degree; S is the vacuum sealing area, $\mu$ is the friction factor; and G is the force of gravity. For the same robot gravity G and friction factor $\mu$, the sealing area S can be selected to be relatively large in order to reduce the required vacuum degree P. For example, various embodiments of the cleaning robots described herein can be attached to a planar surface such as a window pane when the vacuum degree P>0.5 Kpa, making it possible for the cleaning robot to use a general impeller or pump to ensure the safe operability of the cleaning robot. As shown in FIG. 2, the surface area S of the cleaning component 116 is the vacuum sealing area. In one embodiment, the cleaning robot can be attached to a planar surface such as a window pane when the vacuum degree P is between 0.5 Kpa and 2.0 Kpa. The cleaning robot can be attached to a planar surface and moved to clean this surface when the vacuum degree P>2.0 Kpa.

Figure 3:
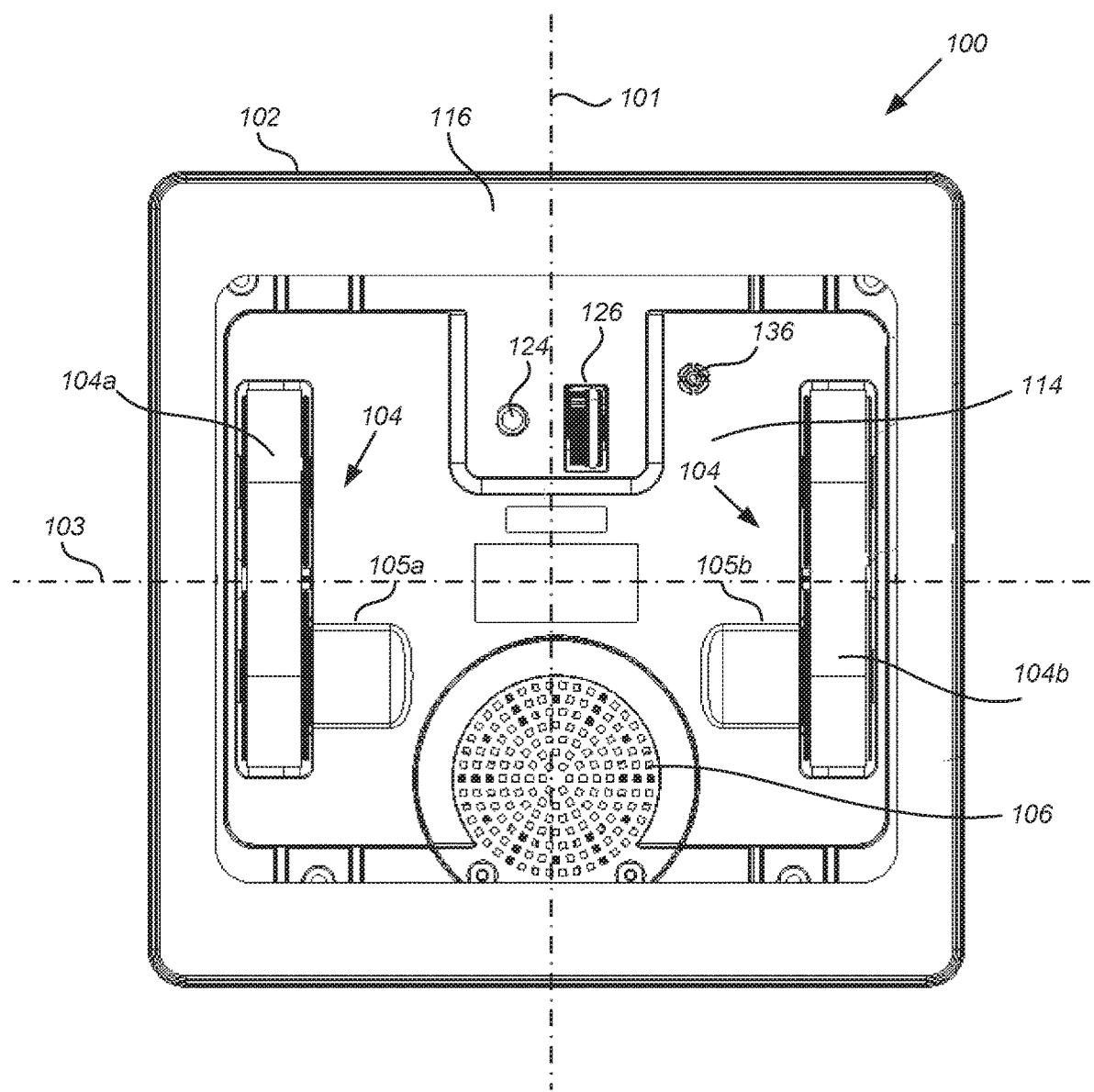
FIG. 3 is a bottom view of the autonomous cleaning robot shown in FIG. 2 in accordance with one embodiment.

FIG. 3 is a bottom view of the autonomous planar surface cleaning robot 100 shown in FIGS. 1 and 2 in accordance with one embodiment. The autonomous cleaning robot 100 comprises a main body 102, a driving mechanism 104, a vacuum source 106, and a cleaning component 116. A longitudinal axis 101 defines left and right halves of the main body 102 along a direction parallel to the direction of the driving mechanism 104. A transverse axis 103 intersects the longitudinal axis 101 orthogonally and defines front and back halves of the main body 102. A vacuum cavity 114 is defined in the center of the main body 102 is a vacuum cavity 114. The cleaning component 116 is arranged along the perimeter outside of the vacuum cavity 114. The robot 100 further comprises an LED indicator 124, a castor 126, and vacuum sensor 136.

Figure 25:
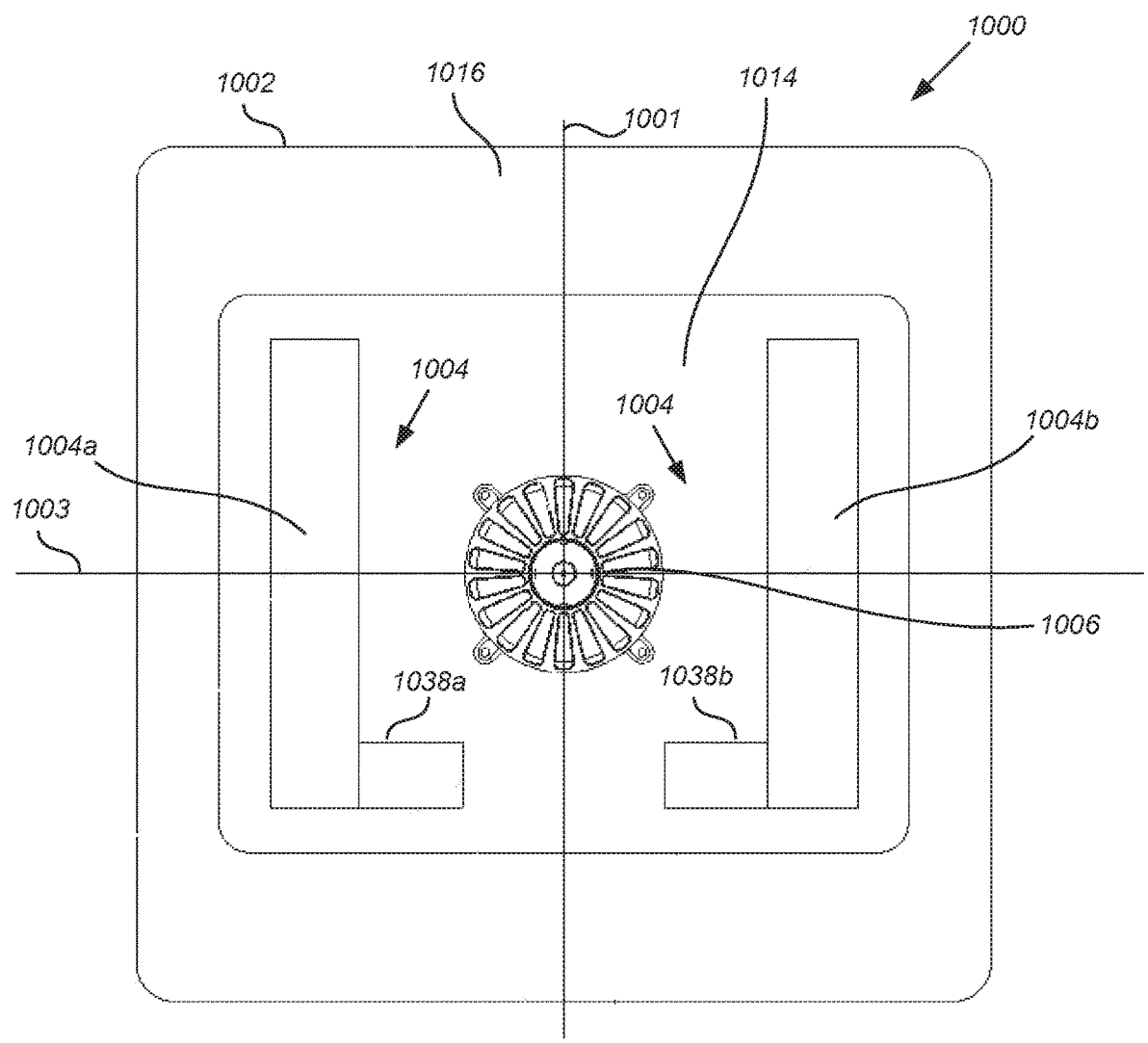
FIG. 25 is a bottom view of an autonomous planar surface cleaning robot having a first driving mechanism configuration in accordance with one embodiment.

The driving mechanism 104 comprises two transmission components 104a, 104b arranged at the left and the right side of the main body 102 relative to the forward and backward moving directions in parallel relationship relative to each other. Each one of the transmission components 104a, 104b comprises a motor 105a, 105b, a gear reducer (not shown but an example is described in FIGS. 20-22), and a transmission device (not shown but an example is described in FIGS. 20-22). As shown in FIG. 25, both motors 1038a, 1308b are positioned on the inner side of the transmission components 104a, 104b and on the same ends.

Figure 4:
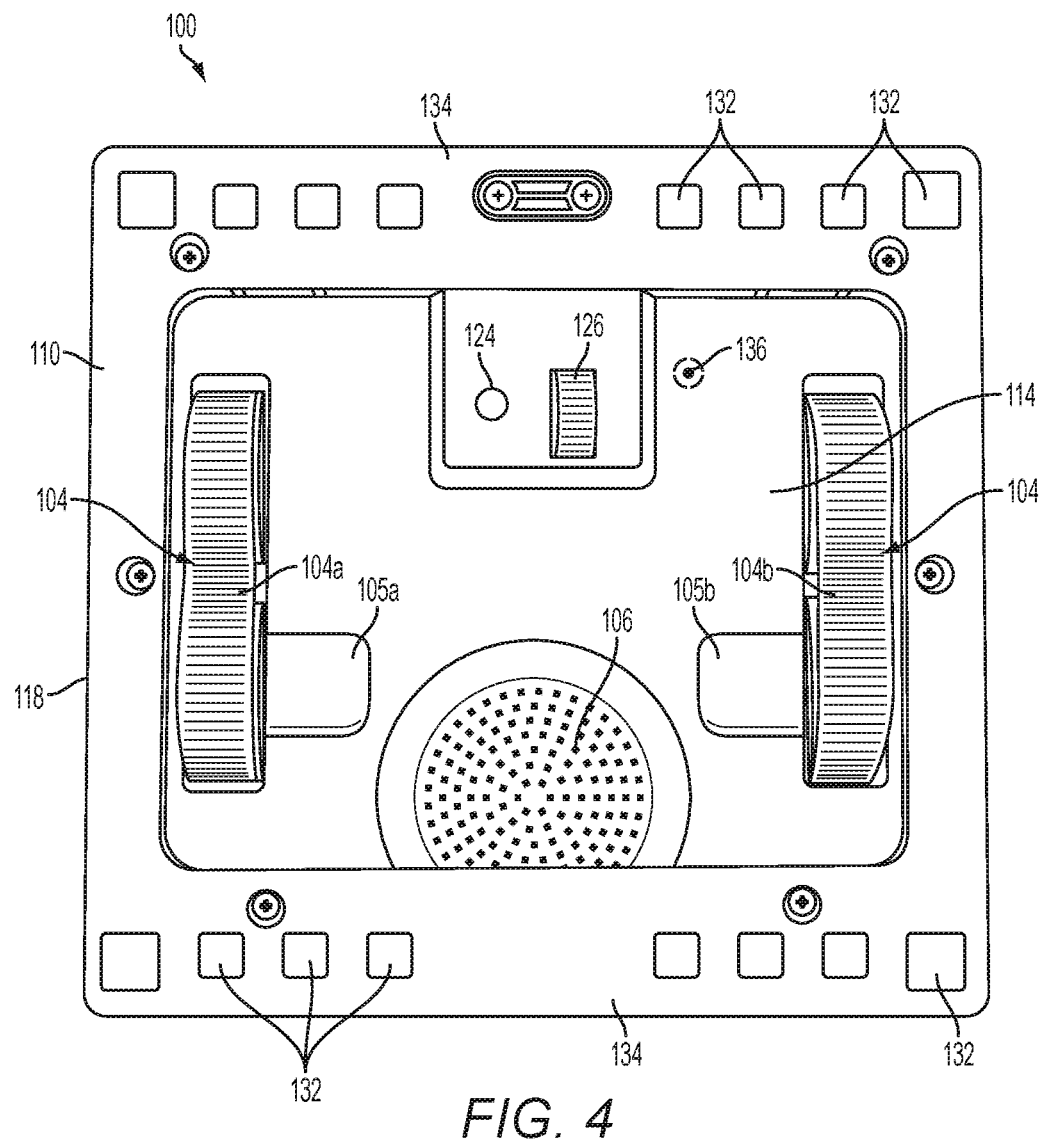
FIG. 4 is a bottom view of the autonomous cleaning robot shown in FIG. 3 with a cleaning element removed to show the underlying structural features in accordance with one embodiment.

FIG. 4 is a bottom view of the autonomous planar surface cleaning robot 100 shown in FIG. 3 with the cleaning component 116 removed to show the underlying structural features in accordance with one embodiment. As shown in FIG. 4, the bottom of the base 110 comprises multiple apertures 132. In the illustrated embodiment, the multiple apertures 132 are arranged at the front and back sides of the of the bottom portion 134 of the base 110. Nevertheless, in other embodiments, the multiple apertures 132 may be arranged at the left and right side of the bottom portion 134 of the base 110 or may be arranged all the way around the perimeter of the bottom portion 134 of the base 110. In one embodiment, the multiple apertures are prior to be arranged at the side of the bottom portion of the base in accordance with the moving direction of the autonomous planar surface cleaning robot 100. The multiple apertures 132 are fluidically coupled to the vacuum cavity 114 defined by the base 110. The autonomous cleaning robot 100 further comprises a sensor 136 configured to sense the degree of vacuum pressure within the cavity 114 defined by the base 110.

The autonomous planar surface cleaning robot 100 is configured to move forward and backward as propelled by the driving mechanism 104. However, as the autonomous cleaning robot 100 moves over a gap between adjacent planar surfaces or an edge of a frameless planar surface, the exposed apertures 132 formed on the bottom of the base 110 will leak air, thus dropping the degree of vacuum pressure within the vacuum cavity 114, which is in fluid communication with the exposed aperture 132. If the degree of vacuum pressure drops below a predetermined threshold, the autonomous cleaning robot 100 will fall off the vertical planar surface. To avoid this unsatisfactory condition, however, the sensor 136 measures the reduction in the degree of vacuum pressure within the vacuum cavity 114 and sends a message (or signal) to the control unit 148 (FIGS. 7 and 28), which instructs the driving mechanism 104 to change the direction of the autonomous cleaning robot 100 until the degree of vacuum pressure the cavity 114 is restored to levels above the predetermined threshold. Thus, this feedback control mechanism can be employed to avoid danger situations, such as, for example, the autonomous cleaning robot 100 falling off a vertical planar surface.

The vacuum sensor 136 may be implemented in many configurations. In one example, the vacuum sensor 136 is configured to measure pressures below atmospheric pressure, indicating the difference between the low pressure and atmospheric pressure (i.e., negative gauge pressure). In another example, the vacuum sensor 136 is configured to measure low pressure relative to a perfect vacuum (i.e., absolute pressure). Any suitable vacuum sensor or pressure sensor configuration may be employed provided that it is configured to determine when the degree of vacuum pressure in the vacuum cavity 114 drops below a predetermined threshold, which is selected based on the relationship $PS\mu \geq G$ in equation (1).

Figure 5:
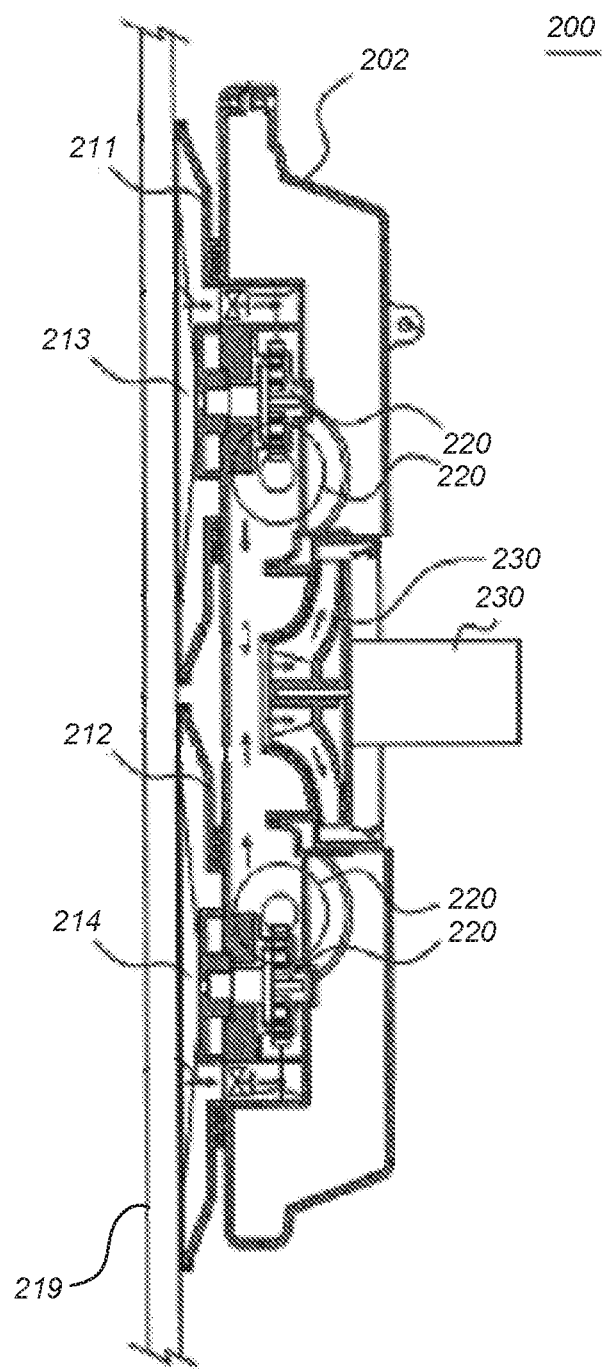
FIG. 5 is a cross-sectional view of a conventional robotic cleaner.

FIG. 5 is a cross-sectional view of a conventional robotic cleaner. FIG. 5 from US patent application publication No. US 2013/0037050 discloses a conventional window cleaning robot 200. Referring to FIG. 5, the cleaner 200 comprises cleaning components 211 and 212, a pump module 230, a driving module 220 and a control system (not shown). The cleaning components 211 and 212 and the plate 219 delimit one space 213 and 214. The pump module 230 is connected to the spaces 213 and 214 to pump air out of the space 213 and 214 to form a negative air pressure in the spaces 213 and 214 so that the cleaner 200 is sucked on the plate 219. The driving module 220 drives cleaning components 211 and 212. The control system (not shown) is coupled to the pump module 230 and the driving module 220 and controls the driving module 220 to cause the cleaning components 211 and 212 to make a movement on the plate 219. However, the motor portion of the pump module 230 arrangement shown in FIG. 5 extends beyond the upper end of the machine housing 202. Furthermore, since the robot 200 does not include a handle, a user must hold both ends of the cleaner robot 200 in order to use it. These and other limitations and deficiencies associated with the conventional window cleaning robot 200 are addressed by various embodiments of the autonomous planar surface cleaning robots described herein.

Accordingly, turning now to FIG. 6, there is shown a cross-sectional view of the autonomous planar surface cleaning robot 100 shown in FIGS. 1-4 in accordance with one embodiment. As previously discussed, the autonomous cleaning robot 100 may be employed to clean planar surfaces such as windows, for example. The particular structure and arrangement of the autonomous cleaning robot 100 shown in FIGS. 1-4 and 6 provides a substantial improvement in window cleaning autonomous robots having a small size and that can be conveniently used by way of the handle 112.

As shown in FIG. 6, the autonomous planar surface cleaning robot 100 comprises a main body 102. The main body 102 is formed by a cover 108 and a base 110. A cavity 142 is defined between the cover 108 and the base 110. The vacuum source 106 is positioned in the cavity 142 and offset from the center of the autonomous cleaning robot 100. The vacuum source 106 comprises a motor 138 operatively coupled to an impeller 140. The motor 138 is positioned in a generally perpendicular relationship to the impeller 140, which is located below the motor 138. The motor 138 drives the impeller 140 to rotate and generate a vacuum at the base 110 of the autonomous cleaning robot 100 such that the robot 100 can suction to a substantially planar surface such as a window plate.

The autonomous cleaning robot 100 further comprises a handle 112 positioned at the upper portion of the cover 108. The handle 112 may be used to lift and carry the autonomous cleaning robot 100. Two inner cavities 144, 146 are located at both ends of the handle 112. The inner cavities 144, 146 can be separate from each other or can be connected together. As shown in FIG. 6, the inner cavity 144 at the one side is suitable for containing a power cord cable and the inner cavity 146 at the other side is suitable for containing at least a portion of the motor 138 and other components associated therewith.

Referring now to FIG. 7, there is shown a schematic block diagram 195 showing the interrelationship of various subsystems of the autonomous planar surface cleaning robot 100 in accordance with one embodiment. The autonomous cleaning robot 100 comprises a driving mechanism 104, a control unit 148, a vacuum source 106, and a power supply unit 150, among other components. The power supply unit 150 is configured to supply electrical power to the driving mechanism 104, the control unit 148, and the vacuum source 106. The autonomous cleaning robot 100 further comprises a cleaning component 116 (as shown in FIGS. 2 and 3). In the embodiments illustrated herein, the cleaning component 116 is a duster. Nevertheless, other cleaning components may be employed without limitation. The cleaning component 116 is removably connected to the bottom portion 134 (as shown in FIG. 4) of the base 110 of the autonomous cleaning robot 100 and thus the cleaning component 116 is easy to wash or replace. Of course, the cleaning component 116 could be a sponge rather than a duster, among other suitable cleaning components. The cleaning component 116 also acts as a seal to maintain a suitable degree of vacuum pressure to hold the autonomous cleaning robot against the planar surface.

Figure 8:
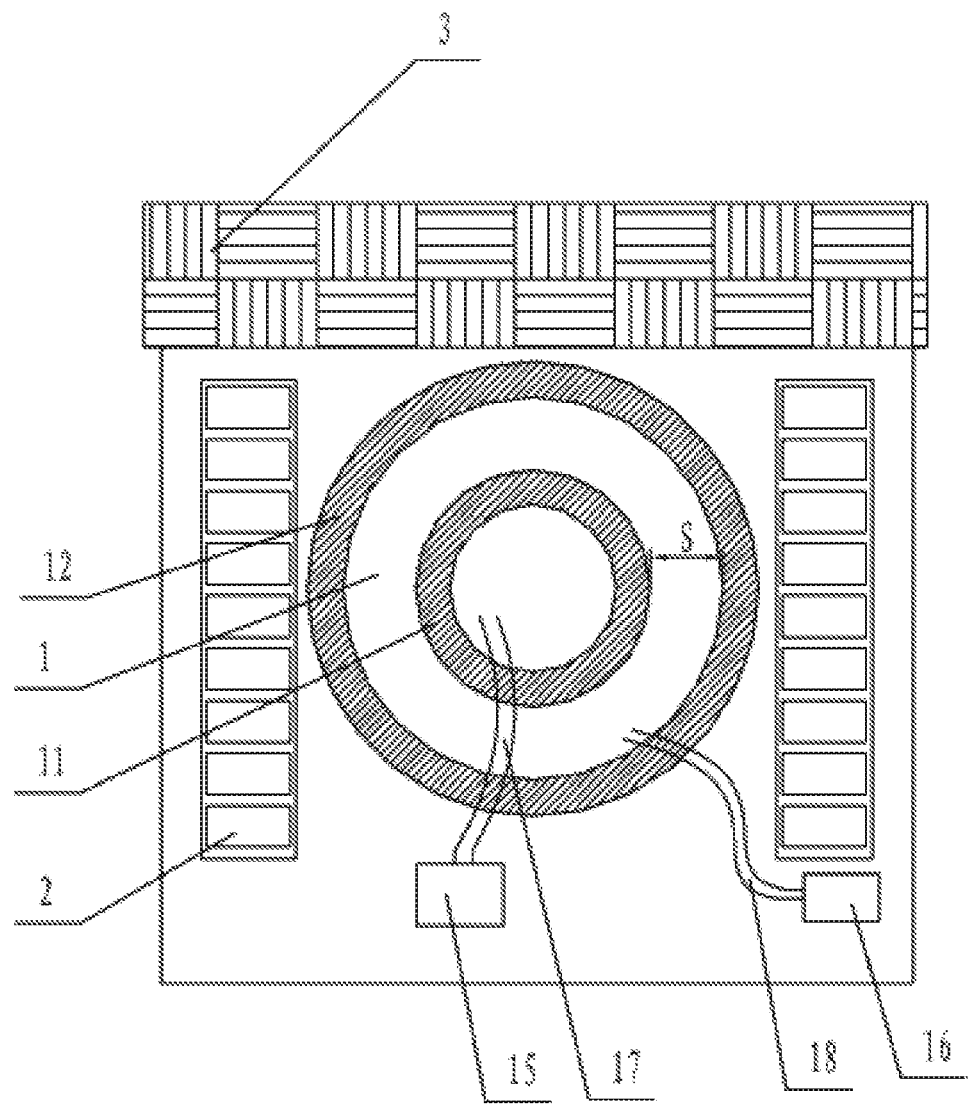
FIG. 8 is a bottom view of a conventional robotic cleaner.

FIG. 8 is a bottom view of a conventional robotic window cleaner. The robotic window cleaner of FIG. 8, is disclosed in China patent application No. CN202669947U. The robotic window cleaner shown in FIG. 8 includes an absorption device 1, a driving mechanism 2, and a cleaning component 3. The absorption device 1 includes a suction cup unit, an inner vacuum pump 15, an outer vacuum pump 16, an inner guiding pipe 17, and an outer guiding pipe 18. The suction cup unit includes an inner suction cup 11 and an outer suction cup 12, the inner suction cup 11 is arranged inside the outer suction cup 12. The inner suction cup 11 is connected to the inner vacuum pump 15. The outer suction cup 12 is connected to the outer vacuum pump 16. A hollow cavity inside the inner suction cup 11 forms an inner negative pressure chamber by means of vacuum suction, and a hollow cavity between the inner suction cup 11 and the outer suction cup 12 forms an outer negative pressure chamber by means of vacuum suction, wherein the outer negative pressure chamber is connected with a vacuum degree detection unit. When the window cleaning robot shown in FIG. 8 detects the hollow cavity between the inner suction cup 11 and the outer suction cup 12 leaks air, the robot will turn direction to avoid danger. But the distance S between the inner suction cup 11 and the outer suction cup 12 is too close, such that the robot does not have time to respond to avoid danger.

Accordingly, the configuration of the window cleaning robot shown in FIG. 8 can be improved to provide much faster response time to avoid potentially dangerous and destructive situations when a vacuum leak occurs during operation of the window cleaning robot. To address these and other limitations associated with the window cleaning robot shown in FIG. 8, the embodiments described hereinbelow comprise vacuum systems to avoid potentially dangerous and destructive situations when a vacuum leak occurs during the operation of the window cleaning robot.

As disclosed in China patent application No. CN202537389U, there exist window cleaning robots that can detect an edge of a frameless glass pane. Such robots comprise a feeler sensor and a control unit. When the robot moves near the edge of the glass pane, a feeler of the feeler sensor leaves from the surface of the glass pane and then the control unit controls the robot turn direction to avoid danger. Such feeler sensors, however, cannot detect edges by detecting when a drop on the degree of vacuum occurs, as described in connection with the embodiments shown in FIGS. 9-13.

Figure 9:
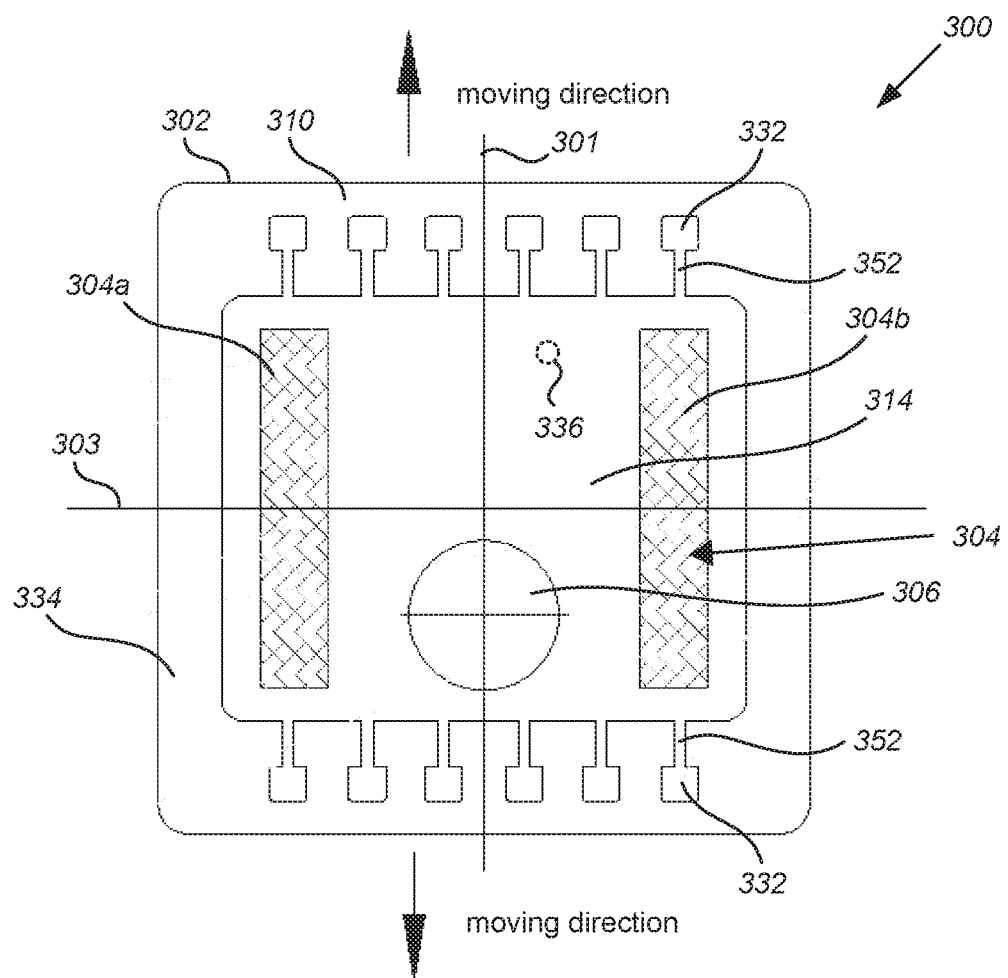
FIG. 9 is a bottom view of an autonomous planar surface cleaning robot comprising a single vacuum source and multiple vacuum apertures in accordance with one embodiment.

FIG. 9 is a bottom view of an autonomous planar surface cleaning robot 300 comprising a single vacuum source 306 and multiple apertures 332 in fluid communication with the vacuum source 306 in accordance with one embodiment. The structural and functional operational features of the autonomous cleaning robot 300 shown in FIG. 9 are substantially similar to those described in connection with the autonomous cleaning robot 100 shown in FIGS. 1-4, 6, and 7, for example. For the sake of clarity of disclosure and to reveal the underlying structures, the cleaning component has been omitted from the embodiment of the autonomous cleaning robot 300 shown in FIG. 9. A longitudinal axis 301 defines left and right halves of the main body 302 along a direction parallel to the direction of the driving mechanism 304. A transverse axis 303 intersects the longitudinal axis 301 orthogonally and defines front and back halves of the main body 302.

The present embodiment of the autonomous cleaning robot 300 is directed to a window cleaning robot configured to sense the occurrence of a drop in the degree of vacuum pressure within a vacuum cavity 314 and to respond in a sufficient amount of time to redirect the motion of the autonomous cleaning robot 300 to avoid a dangerous or destructive situation. The autonomous cleaning robot 300 comprises a control unit (not shown), a driving mechanism 304, and a vacuum source 306. The bottom portion 334 of the base 310 comprises a recessed portion that defines a vacuum cavity 314, which is in fluid communication with the vacuum source 306. Thus, when the vacuum source 306 is activated, a negative pressure is developed between the planar surface and the vacuum cavity 314. Multiple apertures 332 are arranged on at least one side of the base 310 of the autonomous cleaning robot 300. The apertures 332 are in fluid communication with the vacuum cavity 314 and the vacuum source 306 through multiple fluid channels 352. Of course, the apertures 332 may be provided on other side except for above mentioned as well, without limitation. In one embodiment, the apertures are prior to be provided on the side of the base in accordance with the moving direction of the autonomous cleaning robot 300.

When the autonomous cleaning robot 300 is located on a planar surface with the vacuum source 306 activated, the transmission components 304a, 304b, in parallel relationship relative to each other, propel the autonomous cleaning robot 300 along the planar surface. However, when the autonomous cleaning robot 300 moves to an edge of a planar surface without a lip or frame structure provided around its edges, one or more of the multiple apertures 332 can extend over the edge and be exposed to atmospheric pressure causing the degree of vacuum pressure within the vacuum cavity to drop. Such exposure of the one or more apertures 332 to atmospheric pressures reduces the negative vacuum pressure within the vacuum cavity 314 that keeps the autonomous cleaning robot 300 attached to the planar surface.

When the vacuum sensor 336 senses that the degree of vacuum pressure in the vacuum cavity 314 has dropped below a predetermined threshold, the vacuum sensor 336 sends a message or signal to the control unit 148 (FIGS. 7 and 28). In response, the control unit 148 causes the motion of the autonomous cleaning robot 300 to be redirected away from the edges of the planar surface until the degree of vacuum pressure in the vacuum cavity 314 is restored to a value above the predetermined threshold. Thus a potentially dangerous and destructive situation may be avoided. The predetermined vacuum threshold is selected to enable the suction to hold the autonomous robot 300 against the planar surface while still being able to move across its surface.

It will be appreciated that the autonomous cleaning robot 300 is capable of moving in any direction by independently controlling the rotational speed of each of the two components of the transmission components 304a, 304b. Thus, by making one component 304a of the driving mechanism 304 move faster than the other component 304b, the autonomous cleaning robot 300 can be steered in a desired direction. In one aspect, the autonomous cleaning robot 300 is capable of making 360 degree turns in place by making one component 304a of the driving mechanism 304 go forward and the other component 304b go backward.

Figure 10:
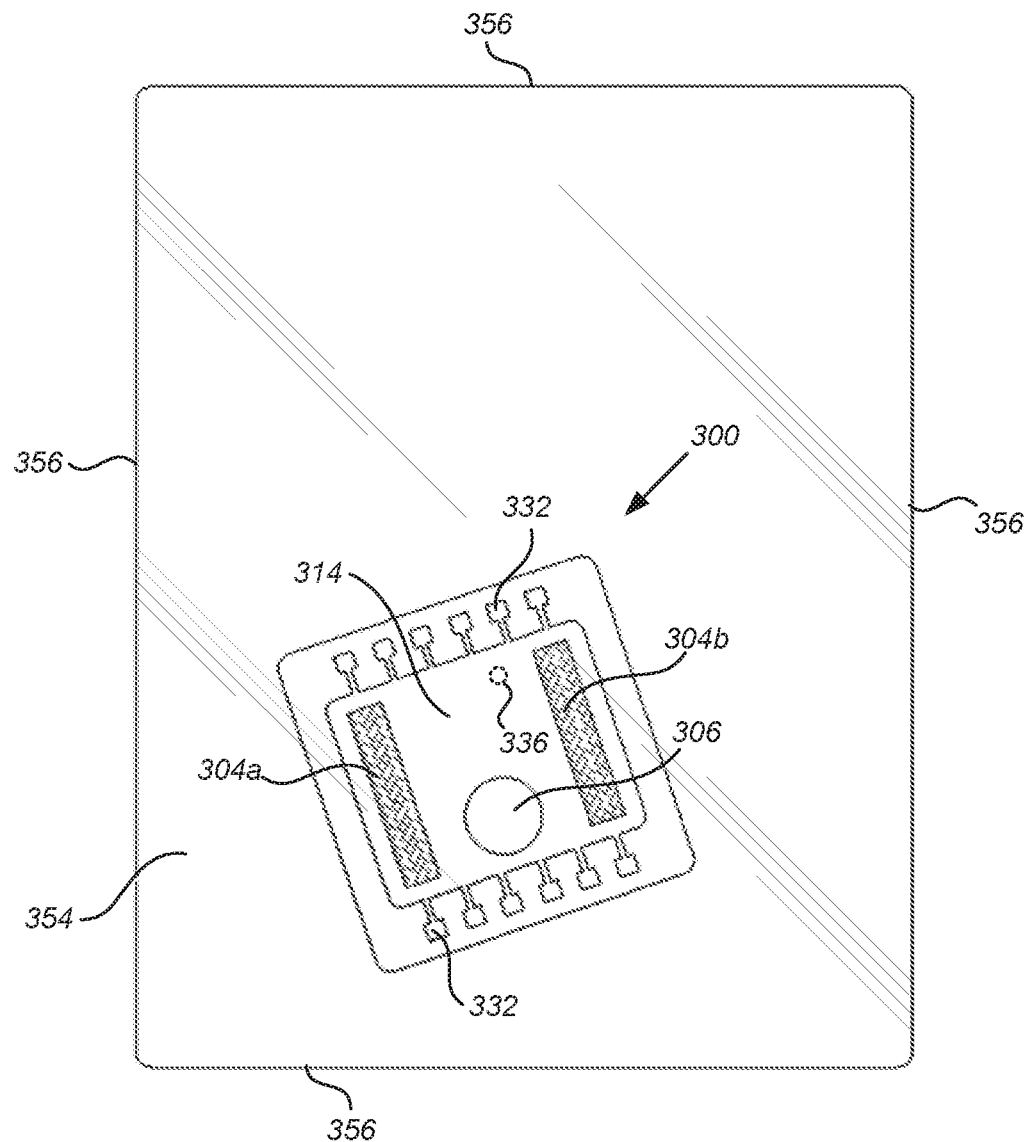
FIG. 10 depicts a bottom view of the autonomous cleaning robot shown in FIG. 9 where the robot is now shown in operation disposed behind a frameless planar surface from the viewing perspective in accordance with one embodiment.
Figure 11:
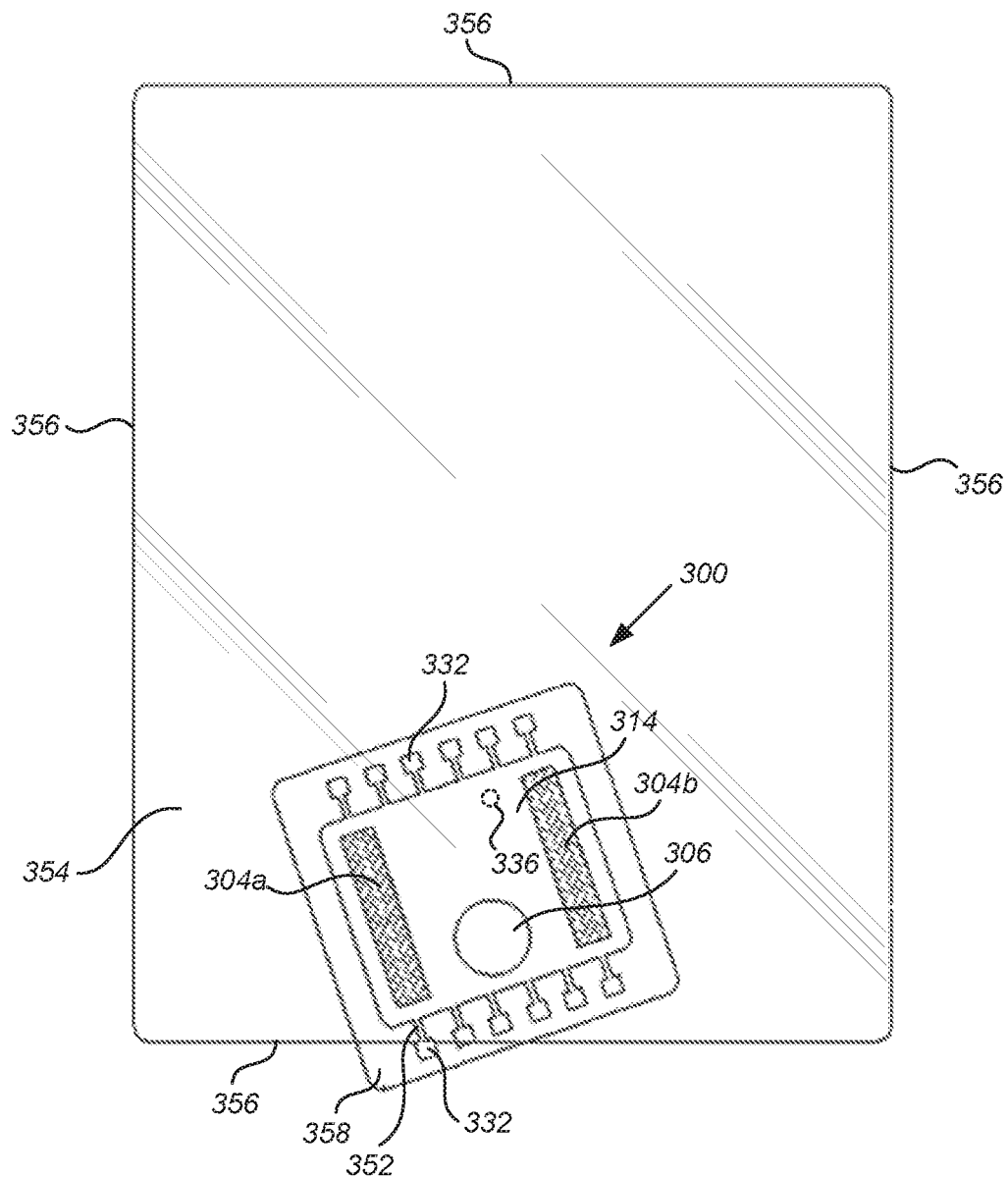
FIG. 11 depicts a bottom view of the autonomous planar cleaning robot shown in FIG. 10 where the robot is now shown in operation partially disposed behind the frameless planar surface from the viewing perspective in accordance with one embodiment.

FIGS. 10 and 11 are diagrams illustrating the operational mode of the autonomous planar surface cleaning robot 300 described in connection with FIG. 9. Also, for the sake of clarity of disclosure and to show the underlying structures, the cleaning component has been omitted from the embodiment of the autonomous cleaning robot 300 shown in FIGS. 10 and 11.

Accordingly, FIG. 10 depicts a bottom view of the autonomous planar surface cleaning robot 300 shown in FIG. 9 where the robot 300 is now shown in operation disposed behind a frameless planar surface 354 from the viewing perspective in accordance with one embodiment. It will be appreciated that the term frameless as used herein refers to a substantially planar surface 354 with a lip or frame structure around its perimeter to arrest or interfere with the motion of the autonomous cleaning robot 300. Therefore, without any feedback control system, like the one described in connection with FIG. 9, there is nothing to prevent the autonomous cleaning robot 300 from extending beyond and falling off one of the edges 356 of the planar surface 354. As shown in FIG. 10, the autonomous cleaning robot 300 is attached to the vertical planar surface 354, a window pane, by way of suction generated in the vacuum cavity 314 when the vacuum source 306 is activated. The autonomous cleaning robot 300 employs the transmission components 304a, 304b to propel itself across the planar surface 354.

FIG. 11 depicts a bottom view of the autonomous planar surface cleaning robot 300 shown in FIG. 10 where the robot 300 is now shown in operation partially disposed behind the frameless planar surface 354 from the viewing perspective in accordance with one embodiment. As shown, the lower left corner 358 (as viewed from the bottom) of the autonomous cleaning robot 300 has extended beyond the bottom frameless edge 356 of the planar surface 354 such that one of the apertures 332 is exposed to atmospheric pressure causing the vacuum cavity 314 to be fluidically coupled to atmospheric pressure through one of the fluid channels 352 fluidically coupling the aperture 332 to the vacuum cavity 314. This causes the degree of vacuum pressure within the vacuum cavity 314 to drop below a predetermined pressure. The vacuum sensor 336 senses the change in the vacuum pressure in the vacuum cavity 314 and sends a message or a signal to the control unit 148 (FIGS. 7 and 28). In response, the control unit 148 causes the motion of the autonomous cleaning robot 300 to be redirected away from the edges 356 of the planar surface 354 by controlling the transmission components 304a, 304b until the degree of vacuum pressure in the vacuum cavity 314 is restored to a value above the predetermined threshold. Accordingly, the feedback system is quick to respond to vacuum leaks caused by the exposure of one or more of the apertures 332 to atmospheric pressure when the autonomous cleaning robot 300 extends beyond an edge 356 of a planar surface 354 being cleaned. Accordingly, a potentially dangerous and destructive situation such as the autonomous cleaning robot 300 losing vacuum pressure against the planar surface 354 and falling off may be avoided.

Figure 12:
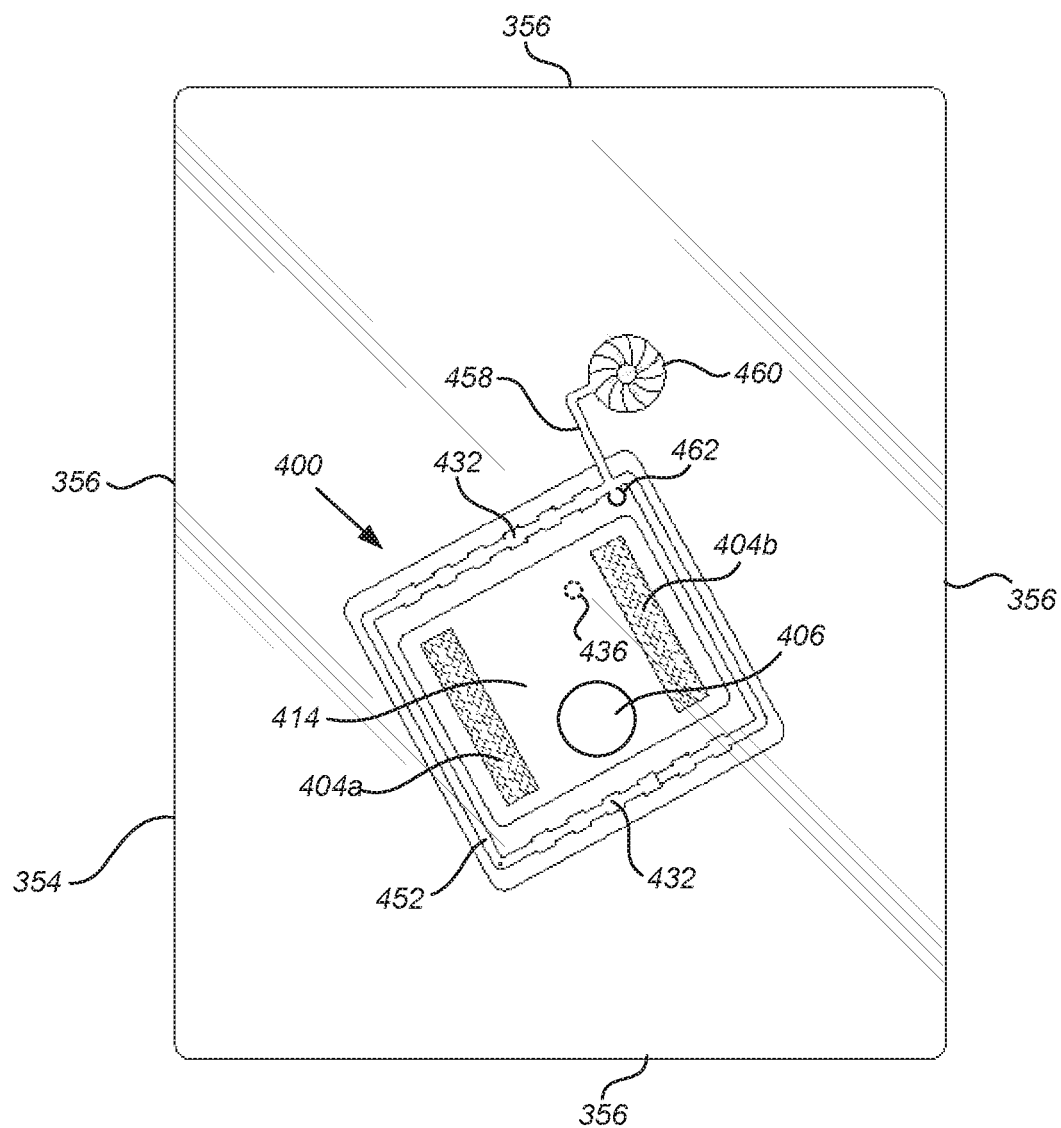
FIG. 12 depicts a bottom view of an autonomous planar surface cleaning robot comprising multiple vacuum sources where the robot is now shown in operation disposed behind a frameless planar surface from the viewing perspective in accordance with one embodiment.
Figure 13:
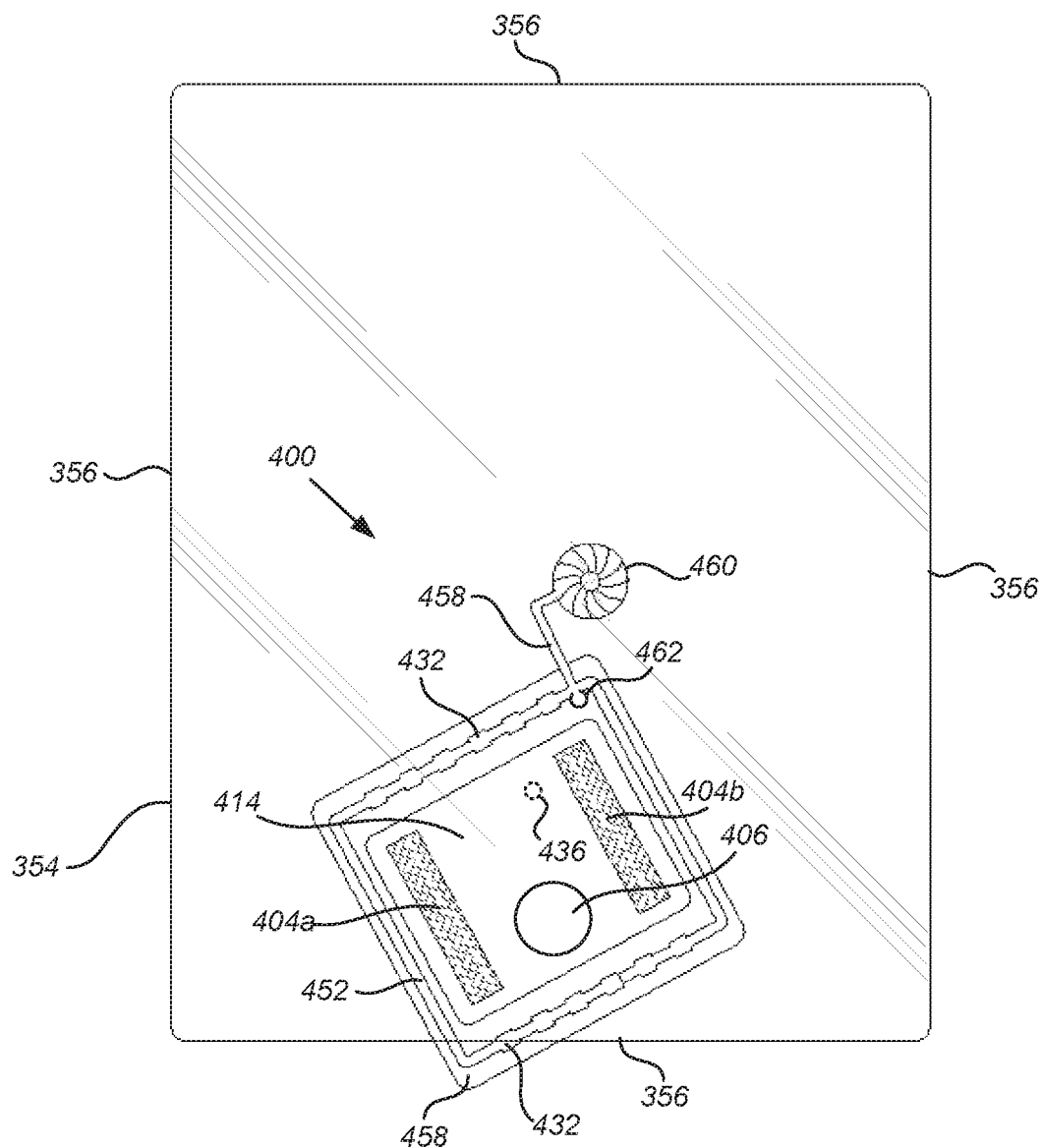
FIG. 13 depicts a bottom view of the autonomous cleaning robot shown in FIG. 12 where the robot is now shown in operation partially disposed behind the frameless planar surface from the viewing perspective in accordance with one embodiment.

FIGS. 12 and 13 are diagrams illustrating the operational mode of one embodiment of an autonomous planar surface cleaning robot 400 comprising multiple vacuum sources 406, 460. For the sake of clarity of disclosure and to show the underlying structures, the cleaning component has been omitted.

FIG. 12 depicts a bottom view of an autonomous planar surface cleaning robot 400 comprising multiple vacuum sources 406, 460 where the robot 400 is now shown in operation disposed behind a frameless planar surface 354 from the viewing perspective in accordance with one embodiment. The autonomous cleaning robot 400 shown in FIG. 12 comprises transmission components 404a, 404b, in parallel relationship relative to each other, a first vacuum source 406, and a recessed portion that acts as a vacuum cavity 414 when the first vacuum source 406 is activated. A first sensor 436 is configured to sense the vacuum pressure that develops in the vacuum cavity 414. The operational details of the driving mechanism 404 and the first vacuum source 406 have been described in connection with the embodiments illustrated in FIGS. 1-4, 6, and 9-11 and therefore, for conciseness and clarity of presentation, such details will not be repeated here. As shown in FIG. 12, the second vacuum source 460 is fluidically coupled to multiple apertures 432 formed around a perimeter of the base portion of the autonomous cleaning robot 400. The multiple apertures 432 are fluidically coupled via a first fluid channel 452. Both the multiple apertures 432 and the first fluid channel 452 are fluidically coupled to the second vacuum source 460 via a second fluid channel 458. A second vacuum sensor 462 is fluidically coupled to the multiple apertures 432, the first and second fluid channels 452, 458 and the second vacuum source 460 to determine a drop in the degree of vacuum pressure therein.

Most notably, in the embodiment illustrated in FIGS. 12 and 13, the first vacuum source 406 is fluidically isolated from the second vacuum source 460 and the multiple apertures 432 are not in fluid communication with the vacuum cavity 414. The first vacuum source 406 and the first vacuum sensor 436 are associated with the vacuum cavity 414, which is configured to hold the autonomous cleaning robot 400 in suction against the planar surface 354 whereas the second vacuum source 460, multiple apertures 432, and the second vacuum sensor 462 are used to sense the edge 356 of the planar surface 354. Thus, when the second vacuum sensor 462 senses the degree of vacuum pressure dropping below a predetermined threshold, the control unit 148 (FIGS. 7 and 28) causes the motion of the autonomous cleaning robot 400 to be redirected away from the edges 356 of the planar surface 354 by controlling the transmission components 404a, 404b until the degree of vacuum pressure in the first fluid channel 452 is restored to a value above the threshold. Accordingly, this arrangement cannot affect the degree of vacuum pressure in the vacuum cavity 414 utilized for holding the autonomous cleaning robot 400 against the planar surface 354 when the multiple apertures 432 leak air. Thus, the safety of the autonomous cleaning robot 400 is ensured.

FIG. 13 depicts a bottom view of the autonomous planar surface cleaning robot 400 shown in FIG. 12 where the robot 400 is now shown in operation partially disposed behind the frameless planar surface 354 from the viewing perspective in accordance with one embodiment. As shown in FIG. 13, the lower left corner 458 (as viewed from the bottom) of the autonomous cleaning robot 400 has extended beyond the bottom frameless edge 356 of the planar surface 354 such that one of the apertures 432 is exposed to atmospheric pressure causing the vacuum in the second cannel 452 to drop. The second vacuum sensor 462 senses the change in the degree of vacuum pressure in the second cannel 452 and sends a message or a signal to the control unit (FIGS. 7 and 28). In response, the control unit causes the motion of the autonomous cleaning robot 400 to be redirected away from the edges 356 of the planar surface 354 by controlling the transmission components 404a, 404b until the degree of vacuum pressure in the second cannel 452 is restored to a value above the predetermined threshold.

The feedback system is quick to respond to vacuum leaks caused by the exposure of one or more of the apertures 432 when the autonomous cleaning robot 400 extends beyond an edge 356 of a planar surface 354 being cleaned. Accordingly, a potentially dangerous and destructive situation such as the autonomous cleaning robot 400 losing vacuum pressure against the planar surface 354 and falling off may be avoided. Furthermore, since the vacuum cavity 414, which is holding the autonomous cleaning robot 400 against the planar surface 354 is isolated from the multiple apertures 432, there is no affect on the holding suction when one or more of the apertures 432 begin to leak vacuum pressure.

Having described several embodiments of autonomous planar surface cleaning robots, China patent application No. CN1075246 discloses a window cleaning device that includes a vacuum housing and a duster. The duster surrounds the vacuum housing, which connects to the outside of the vacuum source. The device attaches to a glass pane by the negative pressure generated by the vacuum housing. The device, however, does not include a driving mechanism and is manually moved by a pole connected to the device. Several shortcomings of this device include manual operation and the vacuum source being located outside of the device makes it difficult to operate. The embodiments disclosed hereinbelow in connection with FIGS. 14-17 overcome these and other shortcomings and provide an autonomous planar surface cleaning robot 500, 600 where the vacuum source is recessed with respect to cleaning component, e.g., the duster. The embodiments further comprise a driving mechanism, a vacuum source, and a cleaning component. The cleaning component extends outwardly beyond the driving mechanism and the vacuum source such that the cleaning component can provide a vacuum seal and auto-clean the planar surface effectively.

Figure 14:
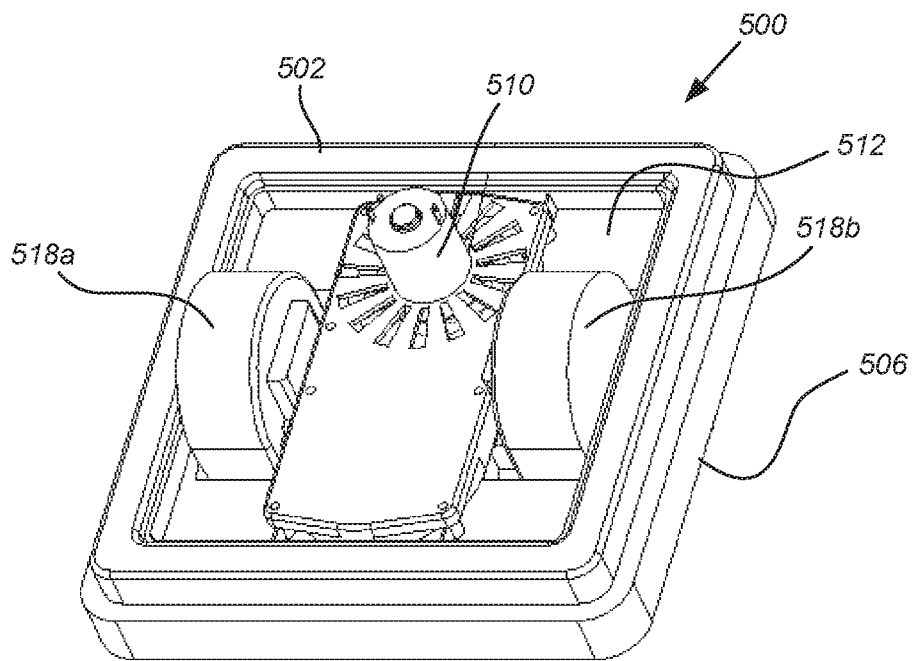
FIG. 14 is a top perspective view of an autonomous planar surface cleaning robot comprising a vacuum source in accordance with one embodiment.
Figure 15:
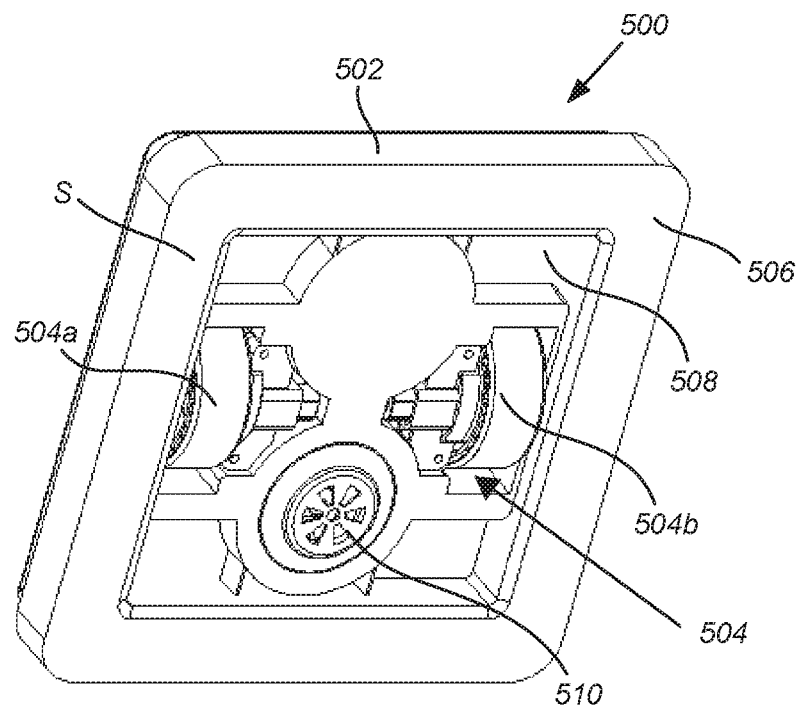
FIG. 15 is a bottom perspective view of the autonomous cleaning robot shown in FIG. 14 in accordance with one embodiment.

Accordingly, turning now to FIG. 14, there is shown a top perspective view of an autonomous planar surface cleaning robot 500 comprising a vacuum source 510 in accordance with one embodiment. FIG. 15 is a bottom perspective view of the autonomous planar surface cleaning robot 500 shown in FIG. 14. With reference now to both FIGS. 14 and 15, the autonomous planar surface cleaning robot 500 comprises a main body 502, a driving mechanism 504, a vacuum source 510, and a cleaning component 506, e.g., a duster. Elements of the transmission components 504a, 504b, in parallel relationship relative to each other, are contained within corresponding guards 518a, 518b. A vacuum cavity 508 is defined at the base 512 of the main body 502. The vacuum cavity 508 is recessed relative to the cleaning component 506 such that the cleaning component 506 can provide a vacuum seal against the planar surface as well as an uninterrupted cleaning surface to effectively clean the planar surface. In other words, the cleaning component 506 performs dual functions. The first function provides a vacuum seal against the planar surface and the second function provides an uninterrupted cleaning surface for cleaning the planar surface. The transmission components 504a, 504b move the autonomous cleaning robot 500 about the planar surface. As shown in FIG. 15, the surface area S of the cleaning component 506 is the vacuum sealing area.

Figure 16:
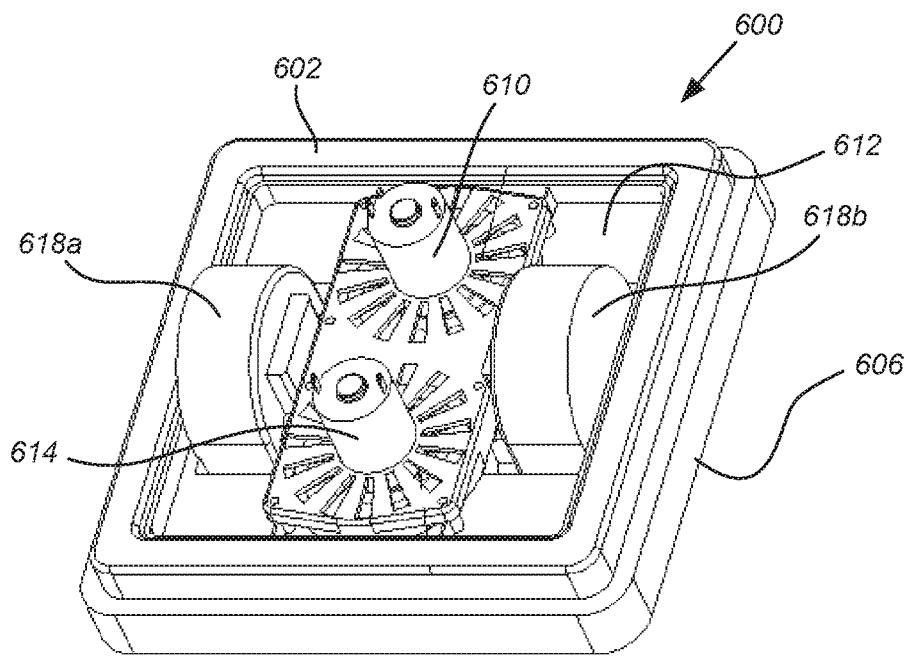
FIG. 16 is a top perspective view of an autonomous planar surface cleaning robot comprising multiple vacuum sources in accordance with one embodiment.
Figure 17:
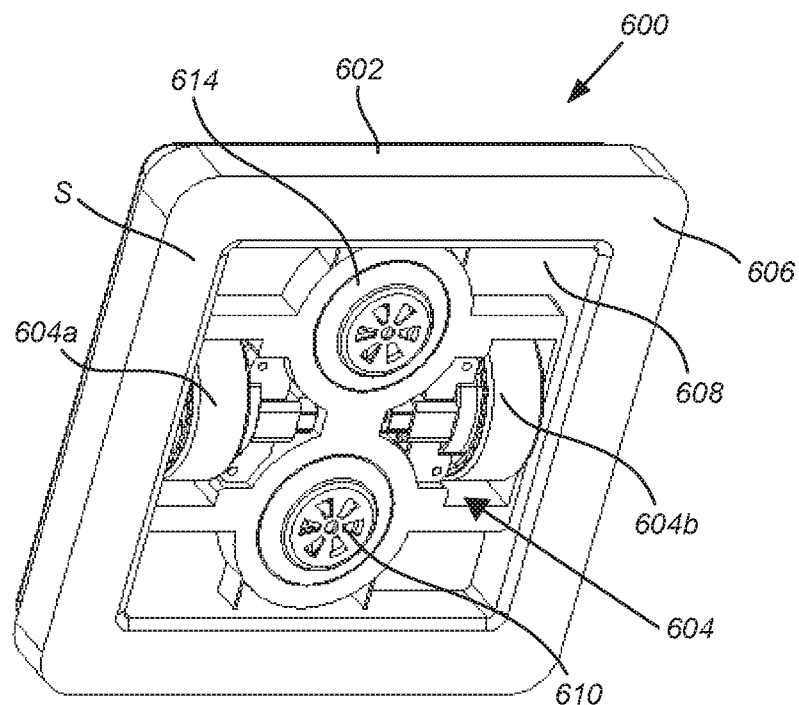
FIG. 17 is a bottom perspective view of the autonomous cleaning robot shown in FIG. 16 in accordance with one embodiment.

FIG. 16 is a top perspective view of an autonomous planar surface cleaning robot 600 comprising multiple vacuum sources 610, 614 in accordance with one embodiment. FIG. 17 is a bottom perspective view of the autonomous planar surface cleaning robot 600 shown in FIG. 16. With reference now to both FIGS. 16 and 17, the autonomous planar surface cleaning robot 600 comprises a main body 602, a driving mechanism 604, a first vacuum source 610, a second vacuum source 614, and a cleaning component 606, e.g., a duster. Elements of the transmission components 604a, 604b are contained within corresponding guards 618a, 618b, in parallel relationship relative to each other. A vacuum cavity 608 is defined at the base 612 of the main body 602. The vacuum cavity 608 is recessed relative to the cleaning component 606 such that the cleaning component 606 can provide a vacuum seal against the planar surface as well as an uninterrupted cleaning surface to effectively clean the planar surface. In other words, the cleaning component 606 performs two functions. The first function provides a vacuum seal against the planar surface and the second function provides an uninterrupted cleaning surface for cleaning the planar surface. The transmission components 604a, 604b move the autonomous cleaning robot 500 about the planar surface. As shown in FIG. 17, the surface area S of the cleaning component 606 is the vacuum sealing area.

Figure 18:
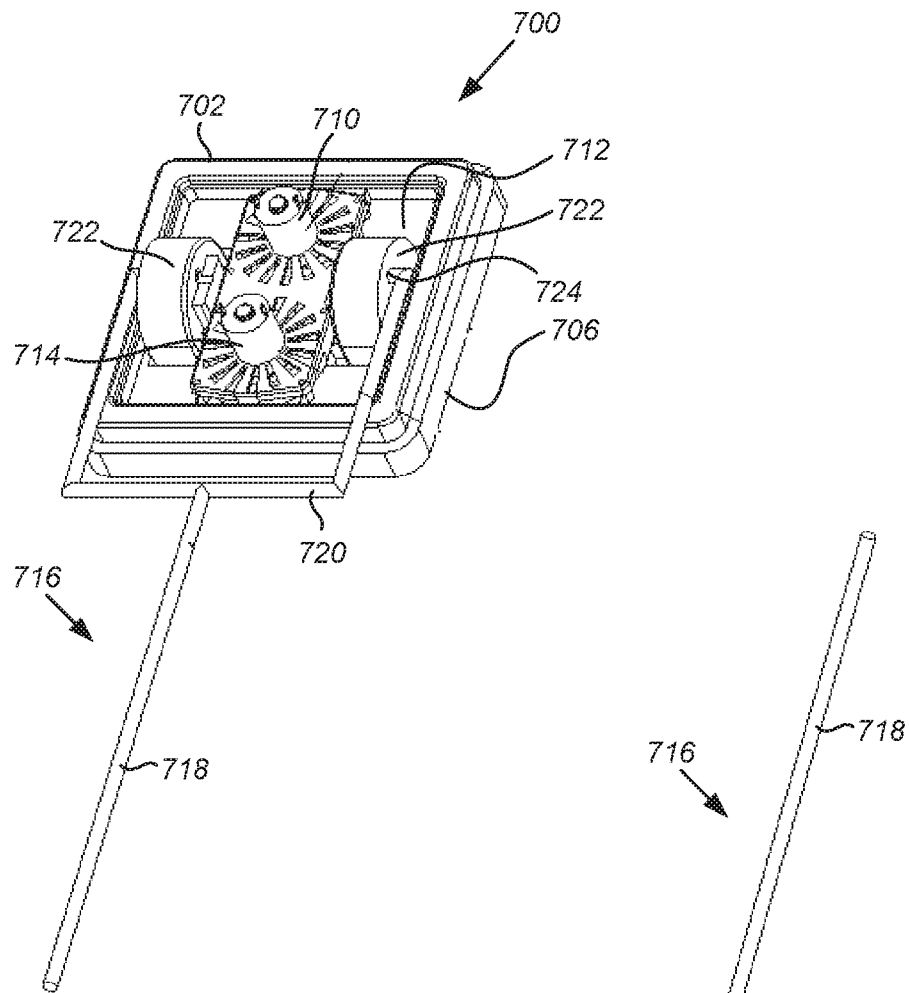
FIG. 18 is a top perspective view of a planar surface cleaning device comprising multiple vacuum sources and a connector pole in accordance with one embodiment.
Figure 19:
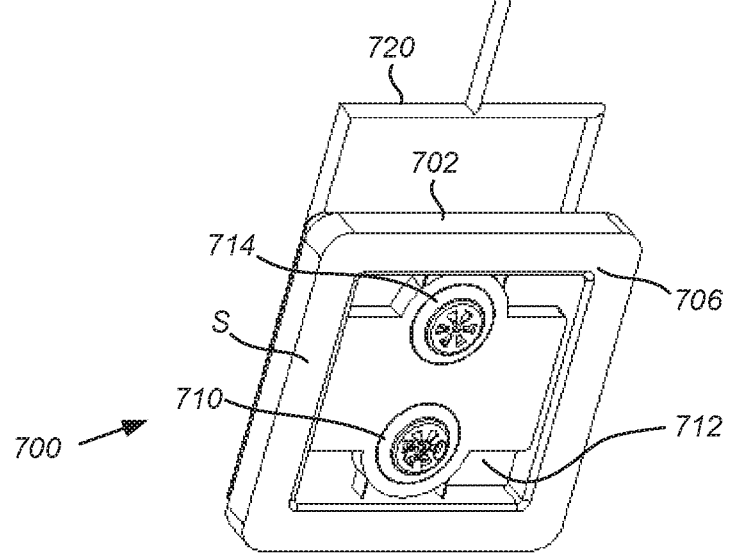
FIG. 19 is a bottom perspective view of the planar surface cleaning device shown in FIG. 18 in accordance with one embodiment.

FIG. 18 is a top perspective view of a planar surface cleaning device 700 comprising multiple vacuum sources 710, 714 and a connector pole 716 in accordance with one embodiment. FIG. 19 is a bottom perspective view of the planar surface cleaning device 700 shown in FIG. 18. With reference now to both FIGS. 18 and 19, the planar surface cleaning device 700 comprises a main body 702, a first vacuum source 710, a second vacuum source 714, a cleaning component 706, e.g., a duster, and a connector pole 716 attached to the main body 702. A vacuum cavity 708 is defined at the base 712 of the main body 702. The vacuum cavity 708 is recessed relative to the cleaning component 706 such that the cleaning component 706 can provide a vacuum seal against the planar surface as well as an uninterrupted cleaning surface to effectively clean the planar surface. In other words, the cleaning component 706 performs two functions. The first function provides a vacuum seal against the planar surface and the second function provides an uninterrupted cleaning surface for cleaning the planar surface.

As shown in FIG. 19, the surface area S of the cleaning component 706 is the vacuum sealing area. The planar surface cleaning device 700 is attached to the planar surface by vacuum suction created by the two vacuum sources 710, 714. The connector pole 716 comprises a handle portion 718 connected to a U shaped portion 720, which is pivotally connected to housing members 722 at pivot points 724. Since the device 700 does not include a driving mechanism, it is operated manually by way of the handle portion 718. Accordingly, the device 700 is moved across a planar surface while the vacuum sources 710, 714 are activated by way of the connector pole 716.

Figure 20:
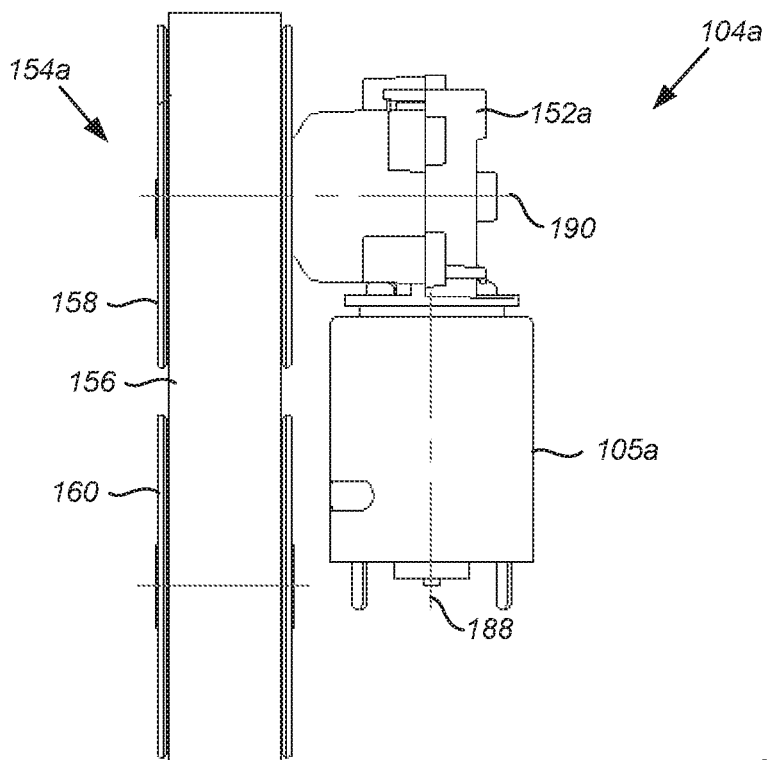
FIG. 20 is a top view of one component of a driving mechanism for an autonomous planar surface cleaning robot in accordance with one embodiment.
Figure 21:
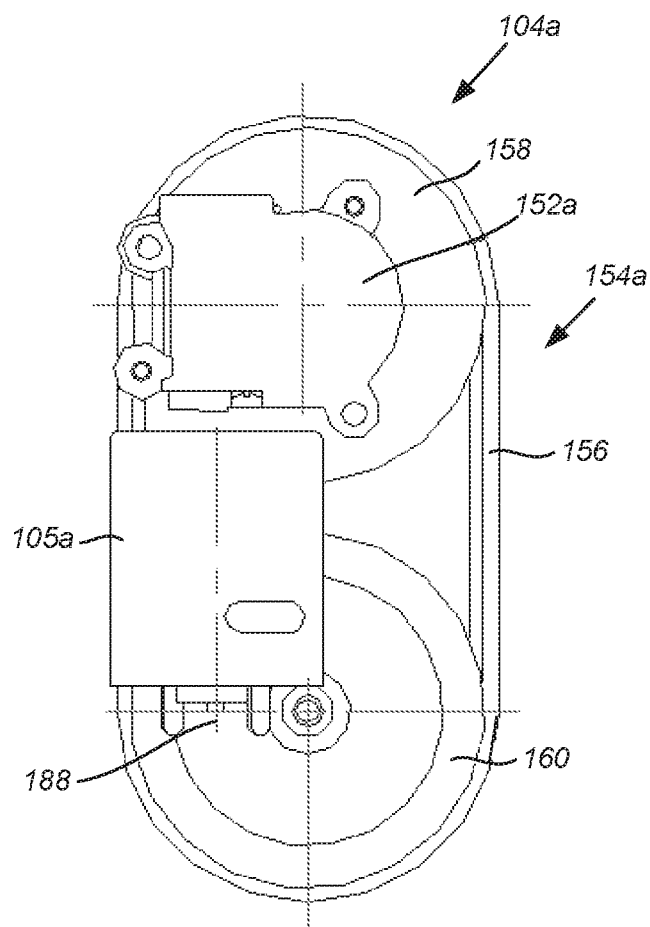
FIG. 21 is a side view of one component of the driving mechanism shown in FIG. 20 in accordance with one embodiment.

FIG. 20 is a top view of one component of a transmission component 104a for an autonomous planar surface cleaning robot in accordance with one embodiment. FIG. 21 is a side view of the component of the transmission component 104a shown in FIG. 20. The transmission component 104a shown in FIGS. 20 and 21 is representative of the transmission components 104a, 304a, 404a, 504a, 604a for the autonomous cleaning robots 100, 300, 400, 500, 600 described in connection with FIGS. 1-4, 6, 7, 9-17. For clarity of presentation, the transmission mechanism 104a will be described in connection with the autonomous cleaning robot 100 with the understanding that the same or similar driving mechanism can be adapted and configured for use with any of the other autonomous cleaning robots 100, 300, 400, 500, 600.

With reference now to FIGS. 2-4, 6, and 20-22, the autonomous cleaning robot 100 comprises two transmission components 104a, 104b arranged to the left and right side of the main body 102 relative to the forward direction of motion. Each transmission components 104a, 104b comprises a motor 105a, 105b, a gear reducer 152a, 152b (not shown), and a transmission system 154a, 154b (not shown). The transmission system 154a comprises a synchronization belt 156, a synchronization driving wheel 158, and a synchronization wheel 160. In operation, the motor 105a drives the synchronization driving wheel 158 to run the synchronization wheel 160 via the synchronization belt 156.

Figure 22:
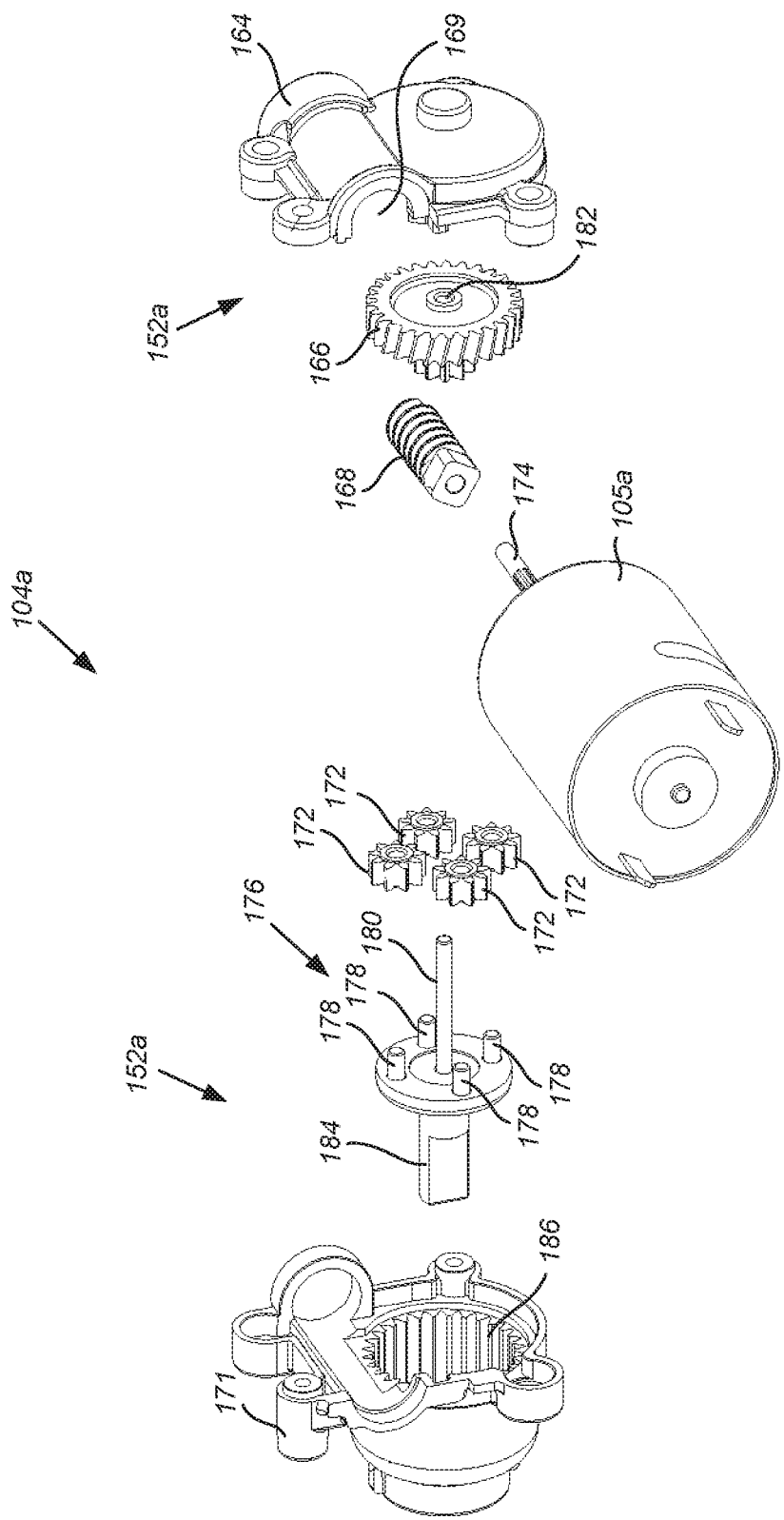
FIG. 22 is an exploded view of a portion of the driving mechanism shown in FIGS. 20 and 21 in accordance with one embodiment.

FIG. 22 is an exploded view of a portion of the transmission components 104a shown in FIGS. 20 and 21 in accordance with one embodiment. As shown in FIG. 22, the gear reducer 152a comprises two components. A first gear box component 162 comprises a cover 164, a worm gear 166, and a worm 168. A second inner gear component 170 comprises an inner gear cover 171, multiple planet gears 172, and output driving mechanism 176. The worm 168 is rotatably movable within an opening 169 formed in the covers 164, 171. The motor axle 174 is operatively coupled to the worm 168, which drives the worm gear 166. The output driving mechanism 176 comprises a longer shaft 180 that is operatively coupled to the worm gear 166 by way of a hub 182, four shorter shafts 178 to receive each of the four planet gears 172, and an output drive axle 184 that is received through the inner gear component 170 and is operatively coupled to the synchronization driving wheel 158. The planet gears 172 are received in meshing arrangement inside the inner gear 186. The gear box component 162 is arranged between the motor 105a and the synchronization wheel 160. This arrangement provides that the center axis 188 of the motor 151 is orthogonal with respect to the center axis 190 of the synchronization driving wheel 158. This arrangement provides a compact structure that saves space along the center axis 190 direction of the synchronization driving wheel 158. Therefore, this arrangement reduces the required size of the internal structure of the robot 100. The configuration of the inner gear component 170 provides small volume, large reduction rate, large torque, and compact structure.

Figure 23:
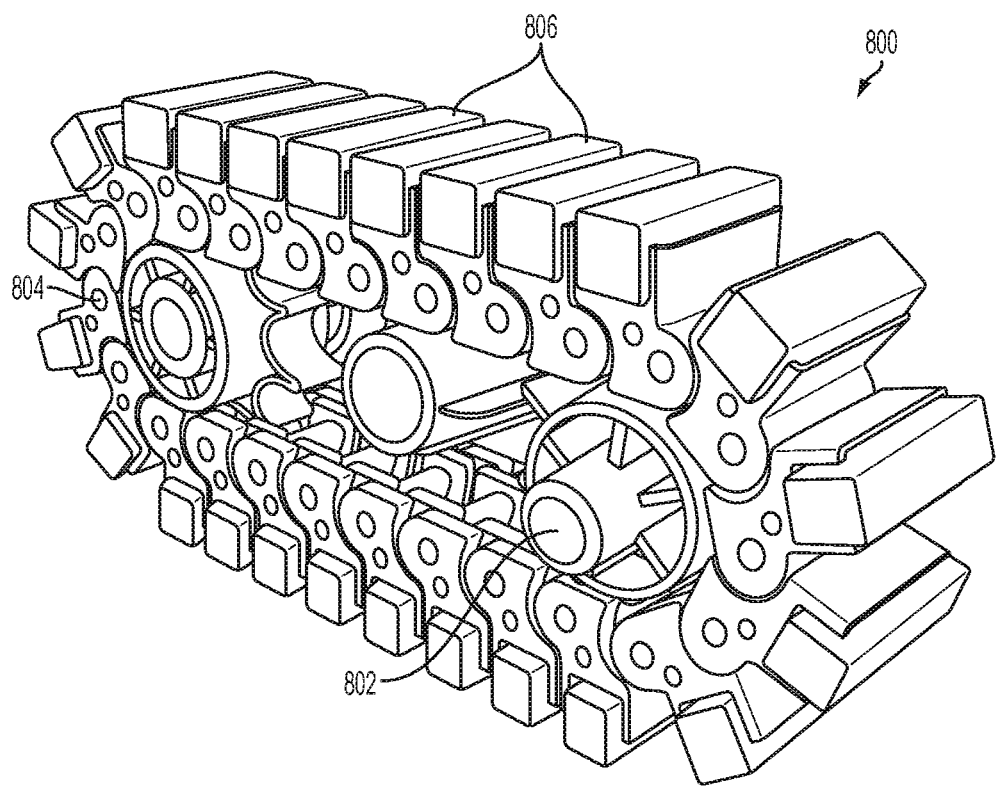
FIG. 23 is a perspective view of a driving mechanism for a conventional window cleaner.

FIG. 23 is a perspective view of a driving mechanism 800 for a conventional window cleaner. Traditionally, the autonomous planar surface cleaning robots 100, 300, 400, 500, 600 described in connection with FIGS. 1-4, 6, 7, 9-17 comprise a driving unit. FIG. 23 illustrates one embodiment of a driving mechanism 800 suitable for use with such robots 100, 300, 400, 500, 600. The driving mechanism 800 comprises a motor (not shown but see FIGS. 19-22 for an example), a driving wheel 802, and a gear reducer (not shown but see FIGS. 19-22 for an example). The driving mechanism 800 comprises a track 804 and a plurality of pads 806. The track 804 structure, however, is prone to air leaks, is noisy, and can cause large vibrancy.

Figure 24:
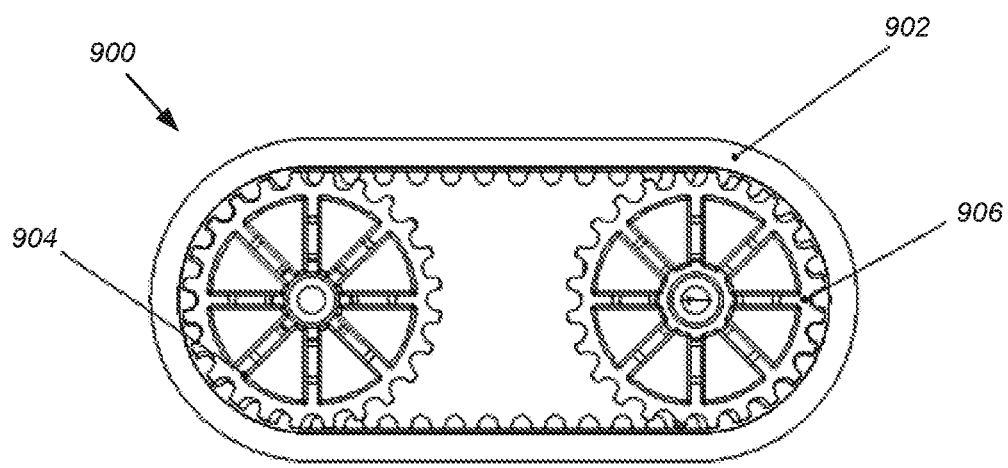
FIG. 24 is a left side view of a driving mechanism for an autonomous planar surface cleaning robot in accordance with one embodiment.

FIG. 24 is a left side view of a transmission system 900 of a driving mechanism for an autonomous planar surface cleaning robot in accordance with one embodiment. The driving mechanism comprises two driving components arranged at the left and the right side of the main body of the robot relative to the direction of motion. Each driving mechanism comprises a motor, a gear reducer, and a transmission system 900. An example of a motor and gear reducer is described in connection with FIGS. 20-22, for example. As shown in FIG. 24, the transmission system 900 comprises a synchronization belt 902, a synchronization driving wheel 904, and a synchronization wheel 906. A motor drives the synchronization driving wheel 904 to run the synchronization wheel 906 via the belt 902.

In one embodiment, the belt 902 can be formed of one single material. In one embodiment, the belt 902 is made of silica gel and its rigidity could be from 40 to 60. Also the same material with hard and soft character can be used together. The belt comprises an outer layer and an inner layer. The outer layer is soft and its rigidity could be from 15~60. The inner layer is hard and its rigidity could be from 40~90. However, in other embodiments, the belt 902 can be made of two separate materials that do not have the same rigidity; one material forming an outer layer and another material forming an inner layer, for example. The outer layer of the belt 902 may be made of rubber or silica gel to supply large friction for moving the robot across vertical planar surfaces such as window panes, for example. The inner layer of the belt 902 can be made of hard rubber to provide adequate hardness for rotating the synchronization driving wheel 904 and the synchronization wheel 906 via the belt 902. Because the belt 902 is flat, the driving mechanism is smooth while the robot moves.

FIG. 25 is a bottom view of an autonomous planar surface cleaning robot 1000 having a first driving mechanism configuration in accordance with one embodiment. The autonomous cleaning robot 1000 comprises a main body 1002, a driving mechanism 1004, a vacuum source 1006, and a cleaning component 1016. A longitudinal axis 1001 defines left and right halves of the main body 1002 along a direction parallel to the direction of the driving mechanism 1004. A transverse axis 1003 intersects the longitudinal axis 1001 orthogonally and defines front and back halves of the main body 1002. A vacuum cavity 1014 is defined in the center of the main body 1002. The cleaning component 1016 is arranged at the outside of the vacuum cavity 1014. Other elements of the autonomous cleaning robot 1000 have been omitted for conciseness and clarity of presentation.

The driving mechanism 1004 comprises two transmission components 1004a, 1004b arranged at the left and the right side of the main body 1002 relative to forward moving direction and in parallel relationship relative to each other. Each one of the transmission components 1004a, 1004b comprises a motor 1038a, 1038b, a gear reducer (not shown but an example is described in FIGS. 20-22), and a transmission device (not shown but an example is described in FIGS. 20-22). As shown in FIG. 25, both motors 1038a, 1038b are positioned on the inner side of the transmission components 1004a, 1004b and on the same ends.

Figure 26:
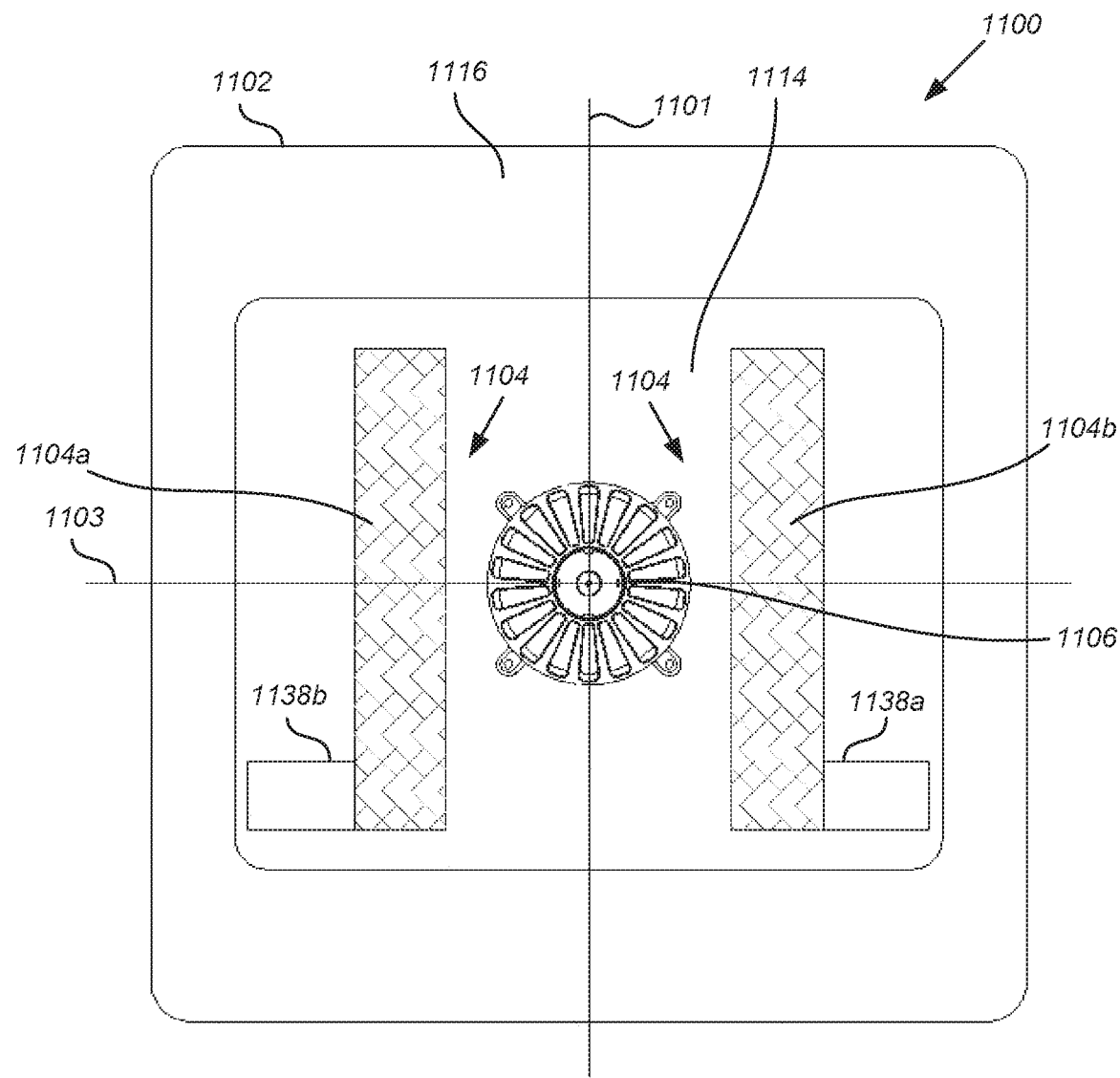
FIG. 26 is a bottom view of an autonomous planar surface cleaning robot having a second driving mechanism configuration in accordance with one embodiment.

FIG. 26 is a bottom view of an autonomous planar surface cleaning robot 1100 having a first driving mechanism configuration in accordance with one embodiment. The autonomous cleaning robot 1100 comprises a main body 1102, a driving mechanism 1104, a vacuum source 1106, and a cleaning component 1116. A longitudinal axis 1101 defines left and right halves of the main body 1102 along a direction parallel to the direction of the driving mechanism 1104. A transverse axis 1103 intersects the longitudinal axis 1101 orthogonally and defines front and back halves of the main body 1102. A vacuum cavity 1114 is defined in the center of the main body 1102. The cleaning component 1116 is arranged at the outside of the vacuum cavity 1114. Other elements of the autonomous cleaning robot 1100 have been omitted for conciseness and clarity of presentation.

The driving mechanism 1104 comprises two transmission components 1104a, 1104b arranged at the left and the right side of the main body 1102 relative to forward moving direction and in parallel relationship relative to each other. Each one of the transmission components 1104a, 1104b comprises a motor 1138a, 1138b, a gear reducer (not shown but an example is described in FIGS. 20-22), and a transmission device (not shown but an example is described in FIGS. 20-22). As shown in FIG. 26, both motors 1138a, 1138b are positioned on the outer side of the transmission systems and on the same ends.

Figure 27:
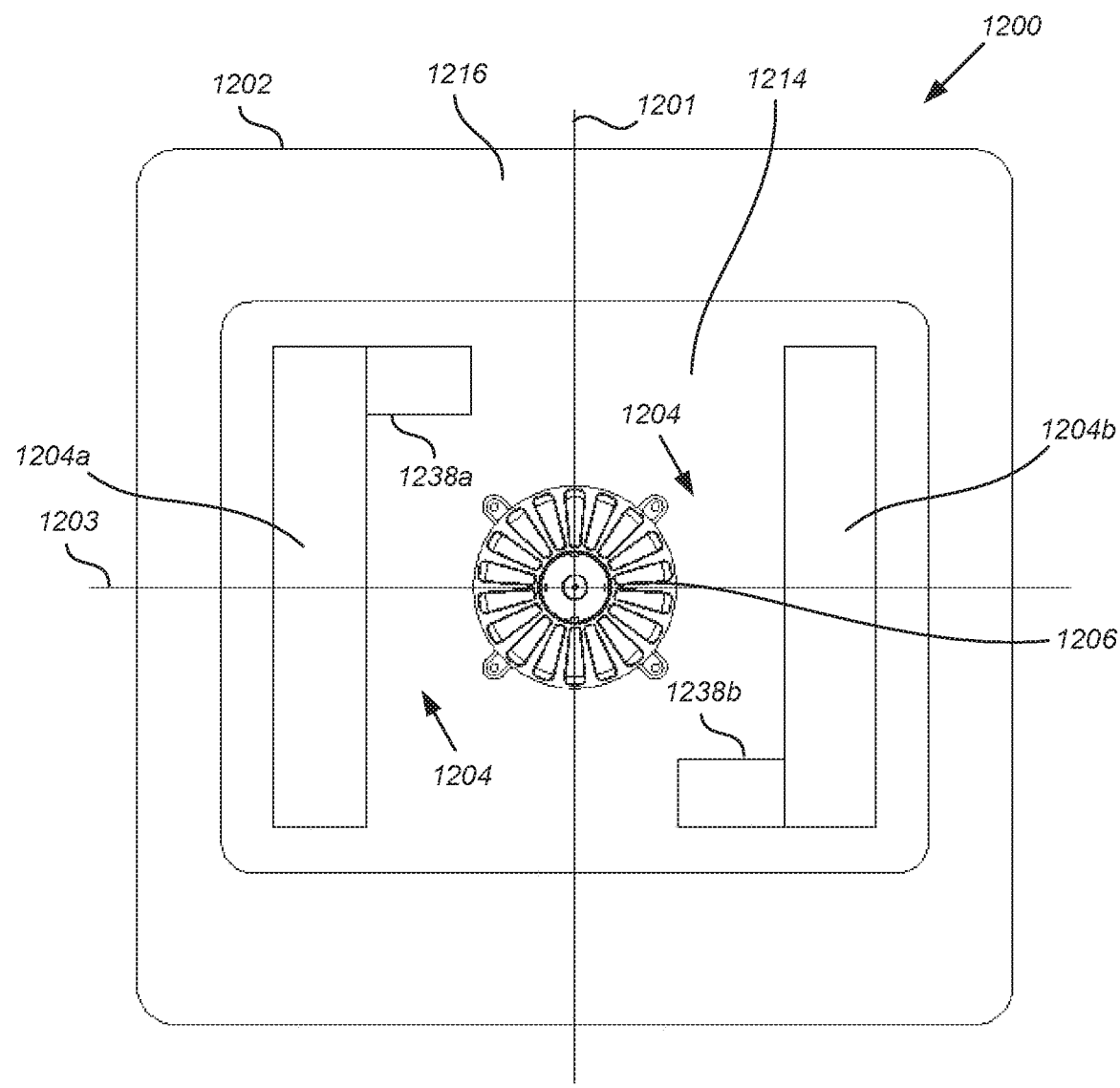
FIG. 27 is a bottom view of an autonomous planar surface cleaning robot having a third driving mechanism configuration in accordance with one embodiment.

FIG. 27 is a bottom view of an autonomous planar surface cleaning robot 1200 having a third driving mechanism configuration in accordance with one embodiment. FIG. 27 is a bottom view of an autonomous planar surface cleaning robot 1200 having a first driving mechanism configuration in accordance with one embodiment. The autonomous cleaning robot 1200 comprises a main body 1202, a driving mechanism 1204, a vacuum source 1206, and a cleaning component 1216. A longitudinal axis 1201 defines left and right halves of the main body 1202 along a direction parallel to the direction of the driving mechanism 1204. A transverse axis 1203 intersects the longitudinal axis 1201 orthogonally and defines front and back halves of the main body 1202. A vacuum cavity 1214 is defined in the center of the main body 1202. The cleaning component 1216 is arranged at the outside of the vacuum cavity 1214. Other elements of the autonomous cleaning robot 1100 have been omitted for conciseness and clarity of presentation.

The driving mechanism 1204 comprises two transmission components 1204a, 1204b arranged at the left and the right side of the main body 1202 relative to forward moving direction and in parallel relationship relative to each other. Each one of the transmission components 1204a, 1204b comprises a motor 1238a, 1238b, a gear reducer (not shown but an example is described in FIGS. 20-22), and a transmission device (not shown but an example is described in FIGS. 20-22). As shown in FIG. 27, both motors 1238a, 1238b are positioned the inner side of the transmission device and the different ends.

FIG. 28 illustrates an architectural or component view of a control unit 148 for an autonomous planar surface cleaning robot in accordance with one embodiment. In various embodiments, as illustrated, the control unit 148 may comprise one or more processors 1362 (e.g., microprocessor, microcontroller) coupled to various sensors 1374 (e.g., motion sensors, vacuum sensors, encoders, castors, image sensors, optical sensors, ultrasonic sensors, among others), and a suitable driver 1370 circuit 9 e.g., a DC motor driver circuit). In addition, to the processor(s) 1362, a storage 1364 (having operating logic 1366) and optional communication interface 1368, are coupled to each other as shown.

As described earlier, the sensors 1374 may be configured to detect parameters associated with the autonomous cleaning robots described such as motion, direction, position, speed, vacuum pressure, among others. The processor 1362 processes the sensor data received from the sensor(s) 1374 to provide feedback to the autonomous robot such as, for example, redirect the robot when a vacuum leak is detected indicating that the robot has exceeded the boundaries of a frameless planar surface such as a window pane. In this particular example, the processor 1362 sends a signal to the driver circuit 1370, which in turn causes the driving mechanism to redirect the robot.

The processor 1362 may be configured to execute the operating logic 1366. The processor 1362 may be any one of a number of single or multi-core processors known in the art. The storage 1364 may comprise volatile and non-volatile storage media configured to store persistent and temporal (working) copy of the operating logic 1366.

In various embodiments, the operating logic 1366 may be configured to process the sensor data, as described above. In various embodiments, the operating logic 1366 may be configured to perform the initial processing of the sensor data, and transmit the data to a host computer, for example, via the communication interface 1368. For these embodiments, the operating logic 1366 may be further configured to receive the sensor data associated and provide feedback to a hosting computer. In alternate embodiments, the operating logic 1366 may be configured to assume a larger role in receiving the sensor data and determining the feedback, e.g., but not limited to, redirecting the robot. In either case, whether determined on its own or responsive to instructions from a hosting computer, the operating logic 1366 may be further configured to control the robot.

In various embodiments, the operating logic 1366 may be implemented in instructions supported by the instruction set architecture (ISA) of the processor 1362, or in higher level languages and compiled into the supported ISA. The operating logic 1366 may comprise one or more logic units or modules. The operating logic 1366 may be implemented in an object oriented manner. The operating logic 1366 may be configured to be executed in a multi-tasking and/or multi-thread manner. In other embodiments, the operating logic 1366 may be implemented in hardware such as a gate array, field programmable gate array (FPGA), programmable logic device (PLD), or application specific integrated circuit (ASIC).

In various embodiments, the communication interface 1368 may be configured to facilitate communication between a peripheral device and the control unit 148. The communication may include transmission of the collected vacuum sensor data or motion, direction, position, and/or speed data associated with the robot. In various embodiments, the communication interface 1368 may be a wired or a wireless communication interface. An example of a wired communication interface may include, but is not limited to, a Universal Serial Bus (USB) interface. An example of a wireless communication interface may include, but is not limited to, a Bluetooth interface.

For various embodiments, the processor 1362 may be packaged together with the operating logic 1366. In various embodiments, the processor 1362 may be packaged together with the operating logic 1366 to form a System in Package (SiP). In various embodiments, the processor 1362 may be integrated on the same die with the operating logic 1366. In various embodiments, the processor 1362 may be packaged together with the operating logic 1366 to form a System on Chip (SoC).

While the examples herein are described mainly in the context of autonomous planar surface cleaning robots, it should be understood that the teachings herein may be readily applied to a variety of other types of autonomous cleaning robots.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

While various details have been set forth in the foregoing description, it will be appreciated that the various aspects of the autonomous planar surface cleaning robots may be practiced without these specific details. For example, for conciseness and clarity selected aspects have been shown in block diagram form rather than in detail. Some portions of the detailed descriptions provided herein may be presented in terms of instructions that operate on data that is stored in a computer memory. Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities.

Unless specifically stated otherwise as apparent from the foregoing discussion, it is appreciated that, throughout the foregoing description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is worthy to note that any reference to "one aspect," "an aspect," "one embodiment," or "an embodiment" means that a particular feature, structure, or characteristic described in connection with the aspect is included in at least one aspect. Thus, appearances of the phrases "in one aspect," "in an aspect," "in one embodiment," or "in an embodiment" in various places throughout the specification are not necessarily all referring to the same aspect. Furthermore, the particular features, structures or characteristics may be combined in any suitable manner in one or more aspects.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

Some or all of the embodiments described herein may generally comprise technologies for autonomous cleaning robots or otherwise according to technologies described herein. In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. Those skilled in the art will recognize, however, that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

All of the above-mentioned U.S. patents, U.S. patent application publications, U.S. patent applications, foreign patents, foreign patent applications, non-patent publications referred to in this specification and/or listed in any Application Data Sheet, or any other disclosure material are incorporated herein by reference, to the extent not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

Some aspects may be described using the expression "coupled" and "connected" along with their derivatives. It should be understood that these terms are not intended as synonyms for each other. For example, some aspects may be described using the term "connected" to indicate that two or more elements are in direct physical or electrical contact with each other. In another example, some aspects may be described using the term "coupled" to indicate that two or more elements are in direct physical or electrical contact. The term "coupled," however, also may mean that two or more elements are not in direct contact with each other, but yet still co-operate or interact with each other.

In some instances, one or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

In summary, numerous benefits have been described which result from employing the concepts described herein.

The foregoing description of the one or more embodiments has been presented for purposes of illustration and description. It is not intended to be exhaustive or limiting to the precise form disclosed. Modifications or variations are possible in light of the above teachings. The one or more embodiments were chosen and described in order to illustrate principles and practical application to thereby enable one of ordinary skill in the art to utilize the various embodiments and with various modifications as are suited to the particular use contemplated. It is intended that the claims submitted herewith define the overall scope.

Various aspects of the subject matter described herein are set out in the following numbered clauses:

1. An autonomous planar surface cleaning robot, comprising: a main body having a top portion and a bottom portion, the bottom portion defining an outer portion defining a surface area about a perimeter thereof and an inner portion defining a cavity formed within the outer portion; a driving mechanism supported by the main body; a vacuum source supported by the main body and in fluid communication with the cavity; a vacuum sensor supported by the main body and in fluid communication with the cavity; and a control unit supported by the main body and electrically coupled to the driving mechanism, the vacuum source, and the vacuum sensor, wherein the control unit is configured to control the robot to turn direction when the control unit receives a signal from the vacuum sensor indicating that a degree of vacuum pressure within the cavity is below a predetermined vacuum pressure.

2. The autonomous planar surface cleaning robot of clause 1, further comprising a handle, wherein the vacuum source further comprises a vacuum motor and an impeller, and wherein at least a portion of the vacuum motor is located within a cavity of the handle.

3. The autonomous planar surface cleaning robot of clause 1, further comprising at least one aperture formed in the outer portion of the bottom portion of the main body, wherein the at least one aperture is in fluid communication with the cavity and the vacuum sensor.

4. The autonomous planar surface cleaning robot of clause 1, further comprising a cleaning component disposed over the surface area defined by the outer portion of the bottom portion of the main body.

5. The autonomous planar surface cleaning robot of clause 4, wherein the cleaning component is removably connected to the outer portion of the bottom portion of the main body.

6. The autonomous planar surface cleaning robot of clause 4, wherein the cleaning component extends outwardly beyond the driving mechanism and the vacuum source to provide a vacuum seal.

7. The autonomous planar surface cleaning robot of clause 6, wherein the cleaning component provides the vacuum seal between a planar surface and the cavity when the cleaning component is applied against the planar surface.

8. The autonomous planar surface cleaning robot of clause 4, further comprising at least one aperture formed in the outer portion of the bottom portion of the main body, wherein the at least one aperture is in fluid communication with the cavity and the vacuum sensor and wherein the cleaning component is disposed over the at least one aperture.

9. The autonomous planar surface cleaning robot of clause 1, wherein the driving mechanism further comprises: a first transmission component; and a second transmission component spaced apart in parallel relationship relative to the first transmission component; wherein the first and second transmission components are located on either side of a longitudinal axis defined by the main body; and wherein each of the first and second transmission components are independently controllable by the control unit.

10. The autonomous planar surface cleaning robot of clause 9, wherein each of the transmission components further comprises: a motor electrically coupled to the control unit; a gear reducer operatively coupled to the motor; and a transmission system operatively coupled to the gear reducer.

11. The autonomous planar surface cleaning robot of clause 10, wherein the gear reducer further comprises: a first gear box component comprising a cover, a worm gear, and a worm; a second inner gear component comprising an inner gear cover, multiple planet gears, and output driving mechanism.

12. The autonomous planar surface cleaning robot of clause 10, wherein the transmission system further comprises: a synchronization belt; a synchronization driving wheel; and a synchronization wheel, wherein the motor is configured to rotatably drive the synchronization driving wheel to rotate the synchronization wheel via the synchronization belt.

13. The autonomous planar surface cleaning robot of clause 12, wherein the synchronization belt is formed of single material.

14. The autonomous planar surface cleaning robot of clause 13, wherein the synchronization belt is a material with hard and soft together character.

15. The autonomous planar surface cleaning robot of clause 12, wherein the synchronization belt is formed of at least two different materials having different rigidity characteristics.

16. The autonomous planar surface cleaning robot of clause 15, wherein the at least two different materials comprise: a first material forming an outer layer of the belt; and a second material forming an inner layer of the belt; wherein the first material is made of rubber or silica gel to supply large friction for moving the robot across the planar surface and the second material is made of hard rubber to provide adequate hardness for rotating the synchronization driving wheel and the synchronization wheel via the belt.

17. An autonomous planar surface cleaning robot, comprising: a main body having a top portion and a bottom portion, the bottom portion defining an outer portion defining a surface area about a perimeter thereof and an inner portion defining a cavity formed within the outer portion; a driving mechanism supported by the main body; a first vacuum source supported by the main body and in fluid communication with the cavity; a second vacuum source supported by the main body and fluidically isolated from the cavity; a vacuum sensor supported by the main body and in fluid communication with the second vacuum source through a fluid channel; and a control unit supported by the main body and electrically coupled to the driving mechanism, the first and second vacuum sources, and the vacuum sensor, wherein the control unit is configured to control the robot to turn direction when the control unit receives a signal from the vacuum sensor indicating that a degree of vacuum pressure within the fluid channel is below a predetermined vacuum pressure.

18. The autonomous planar surface cleaning robot of clause 17, further comprising at least one aperture formed in the outer portion of the bottom portion of the main body, wherein the at least one aperture is in fluid communication with the fluid channel and the vacuum sensor and is in fluid isolation with the cavity.

19. The autonomous planar surface cleaning robot of clause 17, further comprising another vacuum sensor supported by the main body and in fluid communication with the cavity.

20. The autonomous planar surface cleaning robot of clause 17, further comprising a cleaning component disposed over the surface area defined on the outer portion of the bottom portion of the main body.

21. The autonomous planar surface cleaning robot of clause 20, wherein the cleaning component is removably connected to the outer portion of the bottom portion of the main body.

22. The autonomous planar surface cleaning robot of clause 20, wherein the cleaning component extends outwardly beyond the driving mechanism and the vacuum source to provide a vacuum seal.

23. The autonomous planar surface cleaning robot of clause 22, wherein the cleaning component provides the vacuum seal between a planar surface and the cavity when the cleaning component is applied against the planar surface.

24. A driving mechanism for an autonomous planar surface cleaning robot, the robot comprising a main body, a vacuum source, a vacuum sensor, and a control unit, the driving mechanism comprising: a first transmission component; and a second transmission component spaced apart in parallel relationship relative to the first transmission component; wherein each of the first and second transmission components defines first and second ends and first and second sides, wherein the first sides face each other and the second sides face away from each other in a direction transverse from the direction of motion and the first and second ends are oppositely spaced along the direction of motion; and wherein each of the first and second transmission components are independently controllable by the control unit.

25. The driving mechanism of clause 24, wherein the first transmission component comprises a first motor operatively coupled to the control unit and the second transmission component comprises a second motor operatively coupled to the control unit.

26. The driving mechanism of clause 25, wherein the first and second motors are positioned at the first sides of the first and second transmission components and at the first ends of the first and second transmission components.

27. The driving mechanism of clause 25, wherein the first and second motors are positioned at the second sides of the first and second transmission components and at the first ends of the first and second transmission components.

28. The driving mechanism of clause 25, wherein the first and second motors are positioned at the first sides of the first and second transmission components and the first motor is positioned at the first end of the first transmission component and the second motor is positioned at the second end of the second transmission component.

29. A planar surface cleaning apparatus, comprising: a main body having a top portion and a bottom portion, the bottom portion defining an outer portion defining a surface area about a perimeter thereof and an inner portion defining a cavity formed within the outer portion; at least one vacuum source supported by the main body and in fluid communication with the cavity; a cleaning component disposed over the surface area defined on the outer portion of the bottom portion of the main body; and a connector pole comprising: a handle portion; and a U portion connected to the handle portion, wherein the U portion is pivotally connected to the main body.

30. The planar surface cleaning apparatus of clause 29, wherein the cleaning component is removably connected to the outer portion of the bottom portion of the main body.

31. The planar surface cleaning apparatus of clause 29, wherein the cleaning component provides a vacuum seal between a planar surface and the cavity when the cleaning component is applied against the planar surface.

The invention claimed is:

1. A planar surface cleaning robot comprising:
   a body defining a cavity;
   a vacuum source coupled to the cavity, the vacuum source configured to generate a vacuum in the cavity as the planar surface cleaning robot is positioned against a planar surface to support the planar surface cleaning robot on the planar surface; and
   a cleaning component extending along a periphery of the cavity;
   wherein the cleaning component is configured to seal the cavity against the planar surface to maintain the vacuum, and the cleaning component is removably connected to the body.

2. The planar surface cleaning robot of claim 1, further comprising:
   a driving mechanism comprising:
   a first transmission component; and
   a second transmission component;
   wherein at least one of the first transmission component or the second transmission component is located within the cavity; and
   a control unit coupled to the driving mechanism, the control unit configured to independently control each of the first transmission component and the second transmission component to steer the planar surface cleaning robot.

3. The planar surface cleaning robot of claim 2, wherein the vacuum source is located between the first transmission component and the second transmission component.

4. The planar surface cleaning robot of claim 2, further comprising:
   a vacuum sensor configured to sense a vacuum pressure within the cavity;
   wherein the control unit is configured to control at least one of the first transmission component or the second transmission component to steer the planar surface cleaning robot according to the vacuum pressure sensed by the vacuum sensor.

5. The planar surface cleaning robot of claim 1, wherein the cleaning component defines an inner perimeter, wherein at least part of the vacuum source is disposed within the inner perimeter.

6. The planar surface cleaning robot of claim 1, wherein the cleaning component comprises:
   an inner perimeter surrounding the cavity; and
   an outer perimeter aligned with a perimeter of the body.

7. The planar surface cleaning robot of claim 1, wherein a vacuum pressure generated by the vacuum source is >2.0 kPa.

8. The planar surface cleaning robot of claim 1, wherein the body comprises an aperture fluidically coupled to the cavity.

9. The planar surface cleaning robot of claim 8, wherein the aperture is positioned along a side of the body that is oriented orthogonally relative to a movement direction of the planar surface cleaning robot.

10. The planar surface cleaning robot of claim 1, wherein the cleaning component is selected from the group consisting of a duster and a sponge.

11. A planar surface cleaning robot comprising:
    a body defining a cavity;
    a vacuum source coupled to the cavity, the vacuum source configured to pump air out of the cavity to form a negative air pressure therein;
    a cleaning component extending about a periphery of the cavity;
    a first driving wheel coupled to a first motor;
    a second driving wheel coupled to a second motor; and
    a control unit coupled to each of the first motor and the second motor, the control unit configured to independently control each of the first motor and the second motor to steer the planar surface cleaning robot;
    wherein the cleaning component is configured to seal the cavity against a planar surface to maintain a vacuum therein.

12. The planar surface cleaning robot of claim 11, wherein at least one of the first driving wheel or the second driving wheel is located within the cavity.

13. The planar surface cleaning robot of claim 11, wherein the vacuum source is located between the first driving wheel and the second driving wheel.

* * * * *